United States Patent
Matsumoto et al.

(10) Patent No.: US 6,744,482 B2
(45) Date of Patent: Jun. 1, 2004

(54) ACTIVE MATRIX TYPE LIQUID CRYSTAL DISPLAY DEVICE HAVING PARTICULAR POSITIONING REFERENCE PATTERN AND FABRICATION METHOD THEREOF

(75) Inventors: Kimikazu Matsumoto, Tokyo (JP); Takahisa Hannuki, Tokyo (JP); Masashi Koike, Tokyo (JP); Shinichi Nishida, Tokyo (JP); Kunimasa Itakura, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 94 days.

(21) Appl. No.: 10/119,362

(22) Filed: Apr. 9, 2002

(65) Prior Publication Data

US 2002/0191138 A1 Dec. 19, 2002

(30) Foreign Application Priority Data

Apr. 17, 2001 (JP) ........................................ 2001-118083

(51) Int. Cl.⁷ ........................ G02F 1/1343; G02F 1/1333
(52) U.S. Cl. ........................ 349/141; 349/139; 349/142; 349/110
(58) Field of Search ................................ 349/141, 139, 349/142, 110

(56) References Cited

U.S. PATENT DOCUMENTS 5,734,451 A * 3/1998 Yanagawa et al. ............. 349/43
5,760,856 A * 6/1998 Yanagawa et al. ............. 349/42
5,959,708 A * 9/1999 Lee et al. ..................... 349/143
6,049,369 A * 4/2000 Yanagawa et al. .......... 349/141

FOREIGN PATENT DOCUMENTS

| JP | H07-036058 A | | 2/1995 |
| JP | 07-036058 | * | 2/1995 |
| JP | H10-186407 A | | 7/1998 |
| JP | 10-186407 | * | 7/1998 |

* cited by examiner

Primary Examiner—Toan Ton
Assistant Examiner—Mike Qi
(74) Attorney, Agent, or Firm—Hayes Soloway P.C.

(57) ABSTRACT

In an in-plane switching (IPS) mode active matrix type liquid crystal display device, data lines 24 supplied with data signals, common electrode wiring portions 26a and 26b applied with a reference voltage, a common electrode 26, pixel electrodes corresponding to pixels to be displayed, scanning lines 28 supplied with scan signals and TFT's 50 are provided on an active element substrate 11. The common electrode wiring portions 26a and 26b are formed by using a first metal layer, extend in parallel to the scanning line and connected to a common electrode potential at a peripheral portion thereof. Protruded portions 299a and 299b are formed in at least one of the common electrode wiring portions 26a and 26b in such a way that the protruded portions are positioned on both sides of the data line 24 to be formed later. Unevenness of display of the display device is reduced and the aperture ratio thereof is improved.

14 Claims, 33 Drawing Sheets

FIG.1

| 1Z | 20Z | 19Z | 18Z | 17Z | 16Z |
|----|-----|-----|-----|-----|-----|
| 2Z | 21Z | 22Z | 23Z | 24Z | 15Z |
| 3Z | 25Z | 26Z | 27Z | 28Z | 14Z |
| 4Z | 29Z | 30Z | 31Z | 32Z | 13Z |
| 5Z | 33Z | 34Z | 35Z | 36Z | 12Z |
| 6Z | 7Z  | 8Z  | 9Z  | 10Z | 11Z |

| 1Z | 20Z | 19Z | 18Z | 17Z | 16Z |
|----|-----|-----|-----|-----|-----|
| 2Z | 21Z | 22Z | 23Z | 24Z | 15Z |
| 3Z | 25Z | 26Z | 27Z | 28Z | 14Z |
| 4Z | 29Z | 30Z | 31Z | 32Z | 13Z |
| 5Z | 33Z | 34Z | 35Z | 36Z | 12Z |
| 6Z | 7Z  | 8Z  | 9Z  | 10Z | 11Z |

37Z

L(COM) > L(D)

L(D) > L(BM)

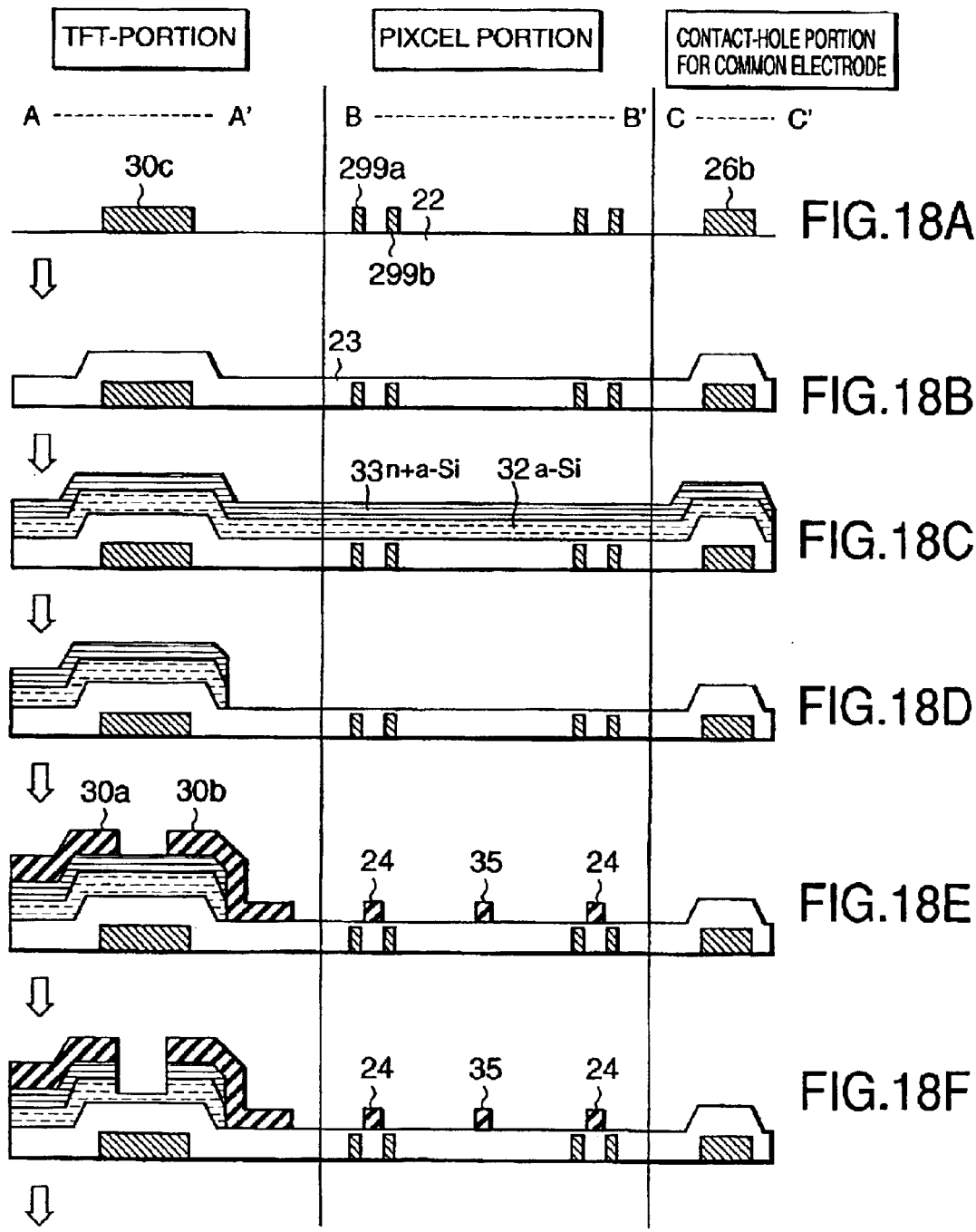

ACTIVE MATRIX TYPE LIQUID CRYSTAL DISPLAY DEVICE HAVING PARTICULAR POSITIONING REFERENCE PATTERN AND FABRICATION METHOD THEREOF

BACKGROUND OF THE INVENTION

1. Field of the Invention

The present invention relates to a liquid crystal display device and a fabrication method thereof and, particularly, to an IPS (In-Plane Switching) mode active matrix type liquid crystal display device and a fabrication method thereof.

2. Description of the Prior Art

An active matrix type liquid crystal display device (referred to as "AMLCD", hereinafter), which uses TFT's (Thin Film Transistors) as pixel switching elements, can provide a high image quality and has been used as a display device of a portable type computer and, particularly, as a monitor of a compact desk-top computer recently.

The AMLCD is roughly classified to a type in which a display is performed by rotating a direction of molecular axis of oriented liquid crystal molecule, which is called "director", in a plane orthogonal to a substrate thereof and a type in which a display is performed by rotating the director in a plane parallel to the substrate.

A liquid crystal display device of the TN (Twisted Nematic) mode is a typical example of the former type and that of the IPS (In-Plane Switching) mode is a typical example of the latter type.

Since, in the AMLCD of the IPS mode, a user basically looks liquid crystal molecules in only shorter axis direction even when a view point is moved, there is no dependency of the "rising" of liquid crystal molecule on a viewing angle and so it is possible to achieve the viewing angle, which is wider than that achievable in the TN mode liquid crystal display device.

In general, when a liquid crystal display device is manufactured, a patterning on a substrate is performed by photolithography using a photo mask.

Since, when the size of a liquid crystal panel becomes larger, the size of the photo mask for transferring a pattern of a liquid crystal panel onto a whole surface of the substrate becomes larger, the cost of the photo mask becomes very high. Therefore, in order to reduce the manufacturing cost, it is usual that repeated patterns to be formed in respective display regions are formed by dividing the whole display region to a plurality of sub regions and exposing the sub regions one by one with using a single small photo mask for one pattern. This technique is generally referred to as "stepper exposure".

However, since the stepper exposure is performed in the display region within the substrate, it is required, in laminating patterned layers in the display region, to precisely pattern an underlying layer in a vertical direction in every shot and to make an error of overlapped area between adjacent exposure shots as small as possible in a horizontal direction in every exposing shot.

When the overlapped area between the adjacent exposure shots is large, the quality of formed pattern becomes different between the exposure shots, resulting in a display defect called unevenness of division.

On the other hand, the IPS mode AMLCD has the merit of wide viewing angle while has a demerit of small area of a aperture of a pixel region. Therefore, the demand of a technique for increasing the area of the aperture has become prosperous recently.

An example of the IPS mode liquid crystal display device is disclosed in JP H07-036058 A (referred to as "prior art 1", hereinafter).

The IPS mode liquid crystal display device disclosed in the prior art 1 is constructed with a TFT array substrate, scanning lines formed on the substrate, which is formed firstly, a common electrode formed in a metal layer, which is in the same layer of the scanning lines, signal lines (referred to as "data lines", hereinafter) formed between the common electrode and an insulating film and pixel electrodes formed in the same layer of the data lines.

Another example of the IPS mode liquid crystal display device is disclosed in U.S. Pat. No. 6,069,678 (corresponding to JP H10-186407 A and referred to as "prior art 2", hereinafter). In one embodiment of the prior art 2, a common electrode is formed in an uppermost layer in lieu of the same layer as the initially formed scanning lines.

Since, in the latter case, it becomes possible to shield electric field generated by the data lines by the common electrode and to widen an effective display region of the pixels, it becomes possible to improve the aperture ratio of the pixel and, hence, the light utilization efficiency.

It is usual that, when a large area LCD is to be exposed by using a stepper, a very high positional accuracy is required between the exposure shots.

Describing this with reference to the stepper exposure, a pattern exposure for a substrate is performed by dividing the pattern as shown in FIG. 1. Assuming that the size of a transparent insulating substrate is constituted with zones 37Z, zones 1Z to 20Z arranged in a peripheral portion form a peripheral terminal portion for inputting voltages to a display region and the display region as a liquid crystal display is formed by zones 21Z to 36Z within an area defined by a thick solid line.

For example, FIG. 2 shows a case where only the exposure shot in the zone 21Z is deviated rightward with respect to a gate layer. FIG. 3A shows an ideally arranged pattern of a layout in the vicinity of a unit TFT element. As shown in FIG. 3A, an interlayer insulating film is formed on a scanning line 28 forming a first wiring layer and a common electrode wiring portion 26a and, on the interlayer insulating film, data lines 24 forming a second wiring layer and a pixel auxiliary electrode 35 are formed. In the TFT region, an amorphous silicon layer 29 is formed on the scanning line 28 and a drain electrode 30a connected to the data line 24 and a source electrode 30b connected to the pixel auxiliary electrode 35 are formed on the amorphous silicon layer 29.

FIG. 3B shows a case where the pattern of the data line, the drain electrode and the pixel auxiliary electrode is deviated in the rightward direction. In FIG. 3B, when the exposure shot of the zone 21Z is deviated rightward with respect to the scanning line 28 (gate line), areas of the drain electrode and the source electrode, which are overlapped with the amorphous silicon layer 29 are reduced. Therefore, write characteristics and holding characteristics of the TFT, which is formed by the exposure shot of the zone 21Z, with respect to voltage applied to liquid crystal of the TFT are varied. Therefore, a display state becomes uneven since only the region in which the exposure shots are deviated becomes dark as shown in FIG. 5, comparing with a uniform display state of a liquid crystal display device having no overlapping deviation between adjacent exposure shots shown in FIG. 4.

When the data line 24 and the pixel auxiliary electrode 35 on the gate layer (scanning line 28) are deviated with respect to the gate layer by various amounts between adjacent exposure shots, the deviation is observed as unevenness of display, which is looked as unevenness of division such as shown in FIG. 6.

In order to achieve such high precision alignment, the second (second wiring layer) and subsequent exposures to be performed subsequent to an exposure of the first layer (first wiring layer), which is performed on absolute position with high precision, must be performed as mentioned below.

Firstly, a test exposure is performed by detecting an alignment marker formed in the first layer and, on the basis of the detected alignment marker as a reference, programming the exposure such that a designed overlapping with the pattern of the first layer is obtained.

Secondly, it is necessary to measure the positional relation of the resist pattern of the second layer to the pattern of the first layer by a fine distance measuring device, detect a deviation of the resist pattern of the first layer from an optimal position on the basis of the measurement and feeding back the detected deviation to the exposure program to thereby make the second exposure shot to the optimal position, and so on.

In the prior art 1 mentioned above, there is the common electrode in the first layer, which extends in a longitudinal direction of the data line of the second layer. Therefore, it is possible to perform the alignment in a lateral direction precisely by using a plurality of common electrodes as references in position measurement in the lateral direction by means of the fine distance measuring device.

Further, it is possible to perform the alignment in a longitudinal direction precisely by using a scanning line in the first layer, which extends laterally, or a wiring for the common electrode for applying a potential to the common electrode as a reference in position measurement in the longitudinal direction by means of the fine distance measuring device.

However, when there is no pattern such as the pattern of the common electrode extending in the extending direction of the data line in the first layer as in the case of the prior art 2, there is no reference for the lateral position measurement by means of the fine distance measuring device. Therefore, there is a problem that it is impossible to precisely perform the lateral alignment and unevenness of division tends to occur.

SUMMARY OF THE INVENTION

The present invention was made in view of these problems and an object of the present invention is to provide an active matrix type liquid crystal display device, which can excludes the problems of the prior art display device.

Another object of the present invention is to provide a manufacturing method for manufacturing the active matrix type liquid crystal display device.

In order to achieve the above objects, the present invention is featured by that a region having sides extending in a wiring direction of a second wiring layer is formed of a material forming a first wiring layer (underlying wiring layer) in the same time as the time in which the first wiring layer is formed.

According to the present invention, in an IPS mode active matrix type liquid crystal display device having a pair of substrates sandwiching a liquid crystal layer therebetween, a first electrically conductive layer, which constitutes scanning lines each extending over a plurality of pixel regions and a common electrode wiring, is formed on one of the substrate pair, which is an active element side substrate on which switching elements such as TFT's are formed. Positioning reference pattern regions each extending in a direction crossing an extending direction of the scanning lines are formed in the first conductive layer. Further, a plurality of switching elements are formed on the active element substrate correspondingly to a plurality of pixel regions related to the scanning lines. A second electrically conductive layer constituting data lines each extending over a plurality of pixel regions related to the plurality of the switching elements is formed simultaneously with the formation of the electrodes of the switching elements and the extending direction of the data line is positioned such that it coincident with an extending direction of the positioning reference pattern regions. Further, a third electrically conductive layer constituting the pixel electrodes and the common electrode is formed on the side of the uppermost layer (close to the liquid crystal layer) and the pixel electrodes are electrically connected to the respective switching elements through contact-holes.

In a preferred embodiment of the IPS mode active matrix type liquid crystal display device according to the present invention, the common electrode is formed of a transparent electrode material and the data lines except portions thereof in the vicinity of the scanning lines are positioned within width of the common electrode. The positioning reference pattern region has at least one of a protruded portion and a recessed portion provided in at least one of a portion of the common electrode wiring and a portion of the scanning line.

In another preferred embodiment, the common electrode and the pixel electrodes are formed of the same material and the common electrode is electrically connected to the common electrode wiring through contact-holes provided in an insulating layer between the first electrically conductive layer and the third electrically conductive layer in every pixel region.

In a further preferred embodiment, a black matrix layer having width smaller than the width of the common electrode covering the data line is formed in a position opposing to the data line on the opposing substrate opposing the active element substrate such that a light shielding film does not exist between the common electrode covering the data line and the pixel electrode adjacent to the common electrode in a plan view.

In another preferred embodiment of the present invention, when the positioning reference patter region is the protruded or recessed portion, the positioning reference pattern regions are arranged on both sides of the data line.

The width of the protruded or recessed portion as the positioning reference pattern region in a direction orthogonal to the data line is preferably not smaller than 2 $\mu$m and not larger than 10 $\mu$m. By setting the width of the protruded or recessed portion in the above mentioned range, it is possible to perform the fine distance measurement with high precision without reducing the aperture ratio.

Particularly, a length of the protruded portion is preferably not smaller than 5 $\mu$m and not larger than the length of the pixel aperture. In such case, it is possible to stably perform the fine distance measurement with high precision.

Further, in a preferred embodiment of the IPS mode active matrix type liquid crystal display device according to the present invention, the switching element is a thin film transistor and a semiconductor layer region for thin film transistors is formed on a first insulating layer formed on the scanning lines as gate electrodes thereof. In this embodiment, a source electrode and a drain electrode of the thin film transistor in the semiconductor layer are formed by a second electrically conductive layer and one of the source and drain electrodes and the other electrodes are electrically connected to the data lines and the pixel electrodes, respectively.

Particularly, the above mentioned IPS mode active matrix liquid crystal display device mentioned above further includes a color layer and the black matrix layer formed on the second substrate. In the liquid crystal display device, a reference potential is applied to the common electrode, the common electrode wiring and the scanning line are formed of the same material in the same step and the gate electrode, the drain electrode, the source electrode and the common electrode are electrically connected to the scanning line, the data line, the pixel electrode and the common electrode wiring, respectively. a display is performed by rotating molecular axis of the liquid crystal layer in a plane parallel to a main surface of the first substrate by electric field applied substantially in parallel to the main surface, the data line except a portion thereof in the vicinity of the scanning line is completely covered by the common electrode by interposing an insulating layer therebetween, the common electrodes are connected to the common electrode wiring through contact-holes provided in the respective pixel regions, at least one of the common electrode wiring and the scanning line has at least one of a protruded portion and a recessed portion extending in the extending direction of the data line in every pixel region, the width of the black matrix arranged in the position opposing to the data line in the region in which the data line is completely covered by the common electrode is smaller than the width of the common electrode covering the data line and there is no light shielding film between the common electrode covering the data line and the pixel electrodes adjacent thereto.

In another embodiment of the present invention, the positioning reference patterns are arranged in the vicinity of the data line as floating regions electrically separated from the scanning line and the common electrode wiring.

In the latter construction having the floating regions, at least one of the floating regions may be formed in only pixel regions of any one of red, green and blue colors. With such arrangement of the floating regions in the pixels of only one of R, G and B colors, it is possible to stably perform the fine distance measurement with high precision. The aperture ratio can be further improved by reducing the number of the floating regions.

At least one of the floating regions may be formed at intervals of several pixel regions. With such arrangement of the floating regions, it is possible to highly precisely perform the fine distance measurement and the aperture ratio can be further improved by reducing the number of the floating regions.

At least one of the floating regions is arranged immediately below the data line with the insulating film interposed therebetween. By arranging the floating region immediately below the data line, it is possible to form a pattern with which the fine distance measurement can be stably performed without reducing the aperture ratio. Further, by providing the floating regions, the data line has no capacitive load and so it is possible to prevent signal delay.

In a method for manufacturing the above mentioned IPS mode active matrix type liquid crystal display device, according to the present invention, in which the pattern formation of at least the display region is performed by the stepper exposure using a divided photo mask, an exposure correction between the divided exposures in performing a patterning of a new layer of laminated layers in which the common electrode wiring is formed by photolithography is performed by finely measuring a relative position of the photo mask to the layer in which the common electrode wiring is formed by means of the positioning reference pattern region.

According to a more preferred embodiment of the present invention, an IPS mode active matrix type liquid crystal display device including at least an active element substrate, an opposing substrate and a liquid crystal layer held between the active element substrate and the opposing substrate, is provided, wherein the opposing substrate includes a color layer and a black matrix layer and the active element substrate includes TFT's each including a gate electrode, a drain electrode and a source electrode, pixel electrodes corresponding to pixels to be displayed, a common electrode supplied with a reference potential, a data line, a scanning line and a common electrode wiring, the common electrode wiring and the scanning line are formed of the same material in the same step, the gate electrode, the drain electrode and the source electrode of the TFT are electrically connected to the scanning line, the data line and the pixel electrode, respectively, and a display is performed by rotating molecular axis of the liquid crystal layer in a plane parallel to a main surface of the active element substrate by electric field applied between the pixel electrode and the common electrode substantially in parallel to the main surface of the active element substrate, the common electrode is formed of a transparent electrode material on a layer closer to the liquid crystal layer than the data line, the data line except a portion thereof in the vicinity of the scanning line is sandwiched between the insulating films and completely covered by the common electrode, the common electrodes are connected to the common electrode wiring through contact-holes provided in the respective pixel regions, the width of the black matrix arranged in the position opposing to the data line in the region including protruded or recessed portions formed by a portion of the common electrode wiring or the scanning line and extending in the extending direction of the data line in every pixel region and completely covered by the common electrode is smaller than the width of the common electrode covering the data line and there is no light shielding film between the common electrode covering the data line and the pixel electrodes adjacent thereto.

According to another embodiment of the present invention, an IPS mode active matrix type liquid crystal display device including at least an active element substrate, an opposing substrate and a liquid crystal layer held between the active element substrate and the opposing substrate, is provided, wherein the opposing substrate includes a color layer and a black matrix layer, the active element substrate includes TFT's each including a gate electrode, a drain electrode and a source electrode, pixel electrodes corresponding to pixels to be displayed, a common electrode supplied with a reference potential, a data line, a scanning line and a common electrode wiring, the common electrode wiring and the scanning line are formed of the same material in the same step, the gate electrode, the drain electrode, the source electrode and the common electrode are electrically connected to the scanning line, the data line, the pixel electrode and the common electrode wiring, respectively, and a display is performed by rotating molecular axis of the liquid crystal layer in a plane parallel to a main surface of the active element substrate by electric field applied between the pixel electrode and the common electrode substantially in parallel to the main surface of the active element substrate, the common electrode is formed of a transparent electrode material on a layer closer to the liquid crystal layer than the data line, the data line except a portion thereof in the vicinity of the scanning line is completely covered by the common electrode with an insulating film sandwiched therebetween, the common electrodes are connected to the common electrode wiring through contact-holes provided in the respective pixels, a pattern extending in the extending direction of the data line every unit element and formed of the same film as that of the common electrode wiring and the scanning line is arranged in the vicinity of the data line or in the vicinity of the pattern formed by the same layer as that of the data line, the pattern formed by the same film as that of the common electrode wiring and the scanning line is electrically floating, the width of the black matrix arranged in the position opposing to the data line in the region in which the data line is completely covered by the common electrode is smaller than the width of the common electrode covering the data line and there is no light shield film between the common electrode covering the data line and the pixel electrodes adjacent thereto.

Since, in such liquid crystal display device, the pattern extending in the longitudinal direction of the data line is formed in the same layer as that including the initially formed scanning line and the common electrode wiring, it becomes possible to precisely perform the alignment for the second and subsequent layers by using the pattern as the reference for the fine distance measurement to thereby obtain the IPS mode liquid crystal display device having high aperture ratio without divisional variation, which is caused by the stepper exposure.

Further, the present invention provides an IPS mode liquid crystal display device featured by that protruded or recessed portions formed by a portion of the common electrode wiring or a portion of the scanning line are arranged such that the data line is put between the protruded or recessed portions. By forming the protruded or recessed portions such that the data line is put between them, it is possible to precisely perform the fine distance measurement between the layer (the layer of the data line) in which the source and/or drain electrode of the TFT is formed and the layer in which the scanning line is formed to thereby perform the alignment between them more precisely.

Further, according to the present invention, an IPS mode liquid crystal display device featured by that the pattern formed in the same layer as that of the common electrode wiring and the scanning line extends in the extending direction of the data line and has a width in a direction perpendicular to the data line extending direction is in a range from 2 $\mu$m or more to 10 $\mu$m or less is provided. By setting the width of the pattern as above, it is possible to perform the fine distance measurement with high precision without reducing the aperture ratio.

Further, according to the present invention, an IPS mode liquid crystal display device featured by that the pattern formed in the same layer as that of the common electrode wiring and the scanning line extends in the extending direction of the data line and has a length in a direction parallel to the data line is not smaller than 5 $\mu$m and not larger than the length of the aperture or less is provided. By setting the length of the pattern as above, it is possible to stably perform the fine distance measurement with high precision without reducing the aperture ratio.

According to the present invention, a manufacturing method for manufacturing an IPS mode active matrix type liquid crystal display device, which includes at least an active element substrate, an opposing substrate, a liquid crystal layer held between the active element substrate and the opposing substrate, the opposing substrate including a color layer and a black matrix layer, the active element substrate including a TFT having a gate electrode, a drain electrode and a source electrode, a pixel electrode corresponding to a pixel to be displayed, a common electrode supplied with a reference potential, a data line, a scanning line, a common electrode wiring, a data line terminal, a scanning line terminal and a common electrode wiring terminal, the common electrode wiring and the scanning line being formed of the same material in the same step, the gate electrode, the drain electrode, the source electrode of the TFT and the common electrode being electrically connected to the scanning line, the data line, the pixel electrode and the common electrode wiring, respectively, a display being performed by rotating molecular axis of the liquid crystal layer in a plane parallel to a main surface of the active element substrate by electric field applied between the pixel electrode and the common electrode substantially in parallel to the main surface of the active element substrate, is provided. In the manufacturing method of the present invention, a pattern formation of at least a display region is performed by a division exposure by using a divided photo mask and an exposure correction in patterning a new layer of a lamination of a plurality of layers, in which the common electrode wiring is formed by photolithography, is performed by a fine measurement of a relative position to the common electrode wiring layer by using a protruded or recessed portion of the common electrode wiring or at least one floating film in the same layer as that of the common electrode wiring layer.

By using the above mentioned method, it is possible to manufacture an IPS mode liquid crystal display device having high aperture ratio without unevenness of division.

With the above mentioned construction, the object of the present invention, that is, to provide an IPS mode liquid crystal display device, which has improved aperture ratio and can prevent the unevenness of display such as unevenness of division, etc., without increasing the manufacturing cost, can be achieved.

BRIEF DESCRIPTION OF THE DRAWINGS

FIG. 1 shows a pattern formed by exposure shots when a divisional exposure in a photolithography is performed ideally;

FIG. 2 shows a pattern formed by exposure shots when a specific one of the exposure shots in the divisional exposure in a photolithography is deviated;

FIG. 18A to FIG. 18K are cross sections of the liquid crystal display device according to the present invention, showing manufacturing steps of a manufacturing method thereof;

DETAILED DESCRIPTION OF THE PREFERRED EMBODIMENTS

Figure 3A:
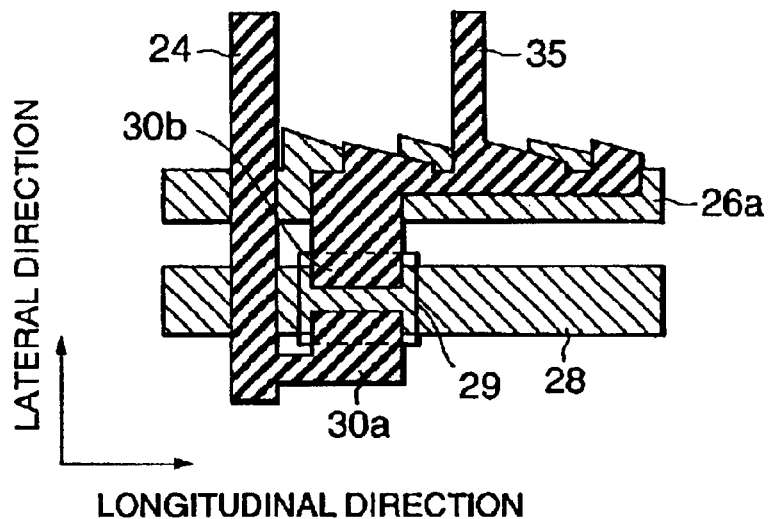
FIG. 3A is a plan view of a unit element when a structure in the vicinity of a TFT element is formed ideally.
Figure 3B:
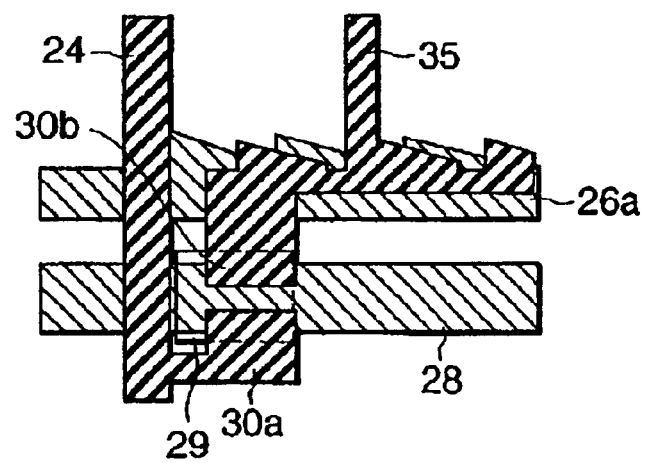
FIG. 3B is a plan view of the unit element when a data line layer shown in FIG. 3A is deviated rightward with respect to a gate line layer.
Figure 4:
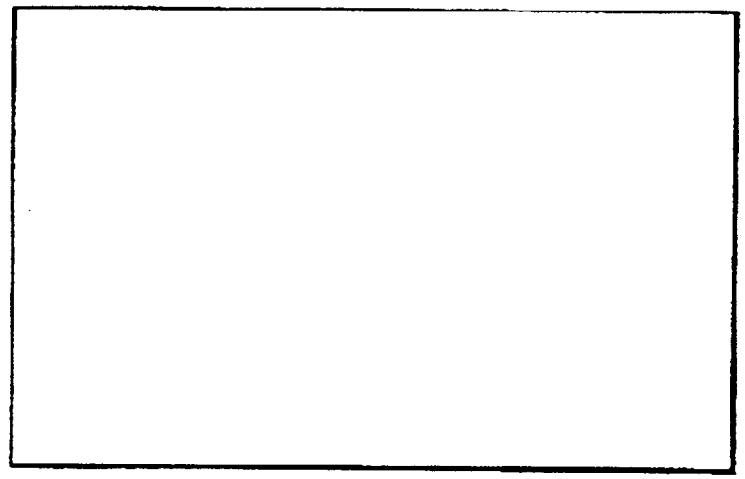
FIG. 4 illustrates middle tone display of a liquid crystal panel manufactured by the divisional exposure shown in FIG. 1.
Figure 5:
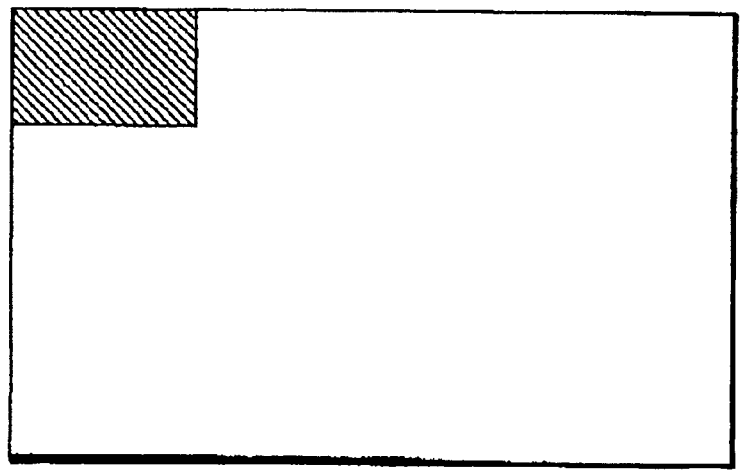
FIG. 5 illustrates middle tone display of a liquid crystal panel manufactured by the divisional exposure shown in FIG. 2.
Figure 6:
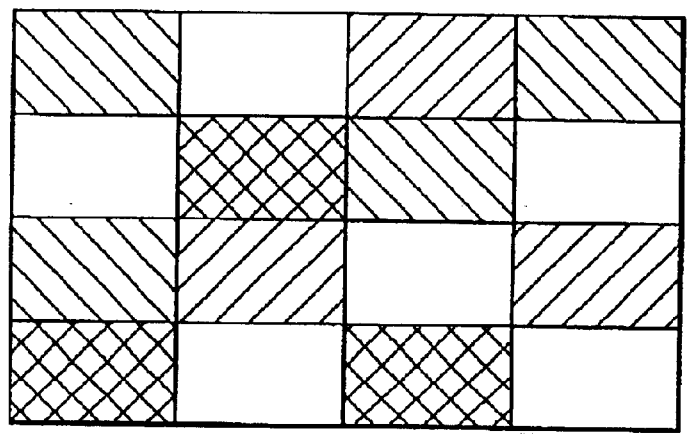
FIG. 6 illustrates a divisional variation in middle tone display.
Figure 7:
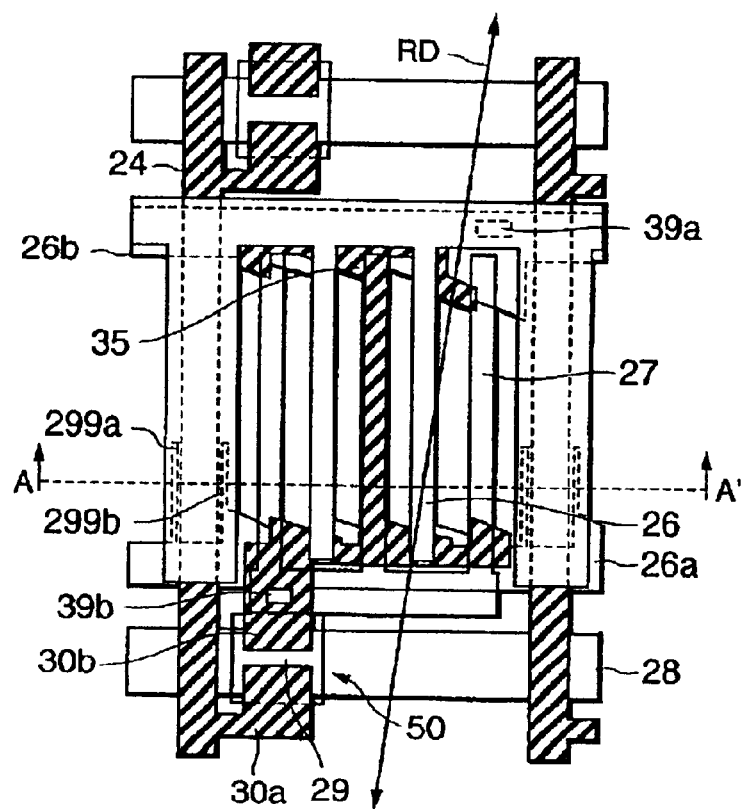
FIG. 7 is a plan view showing a unit pixel of a liquid crystal display device according to an embodiment of the present invention.
Figure 8:
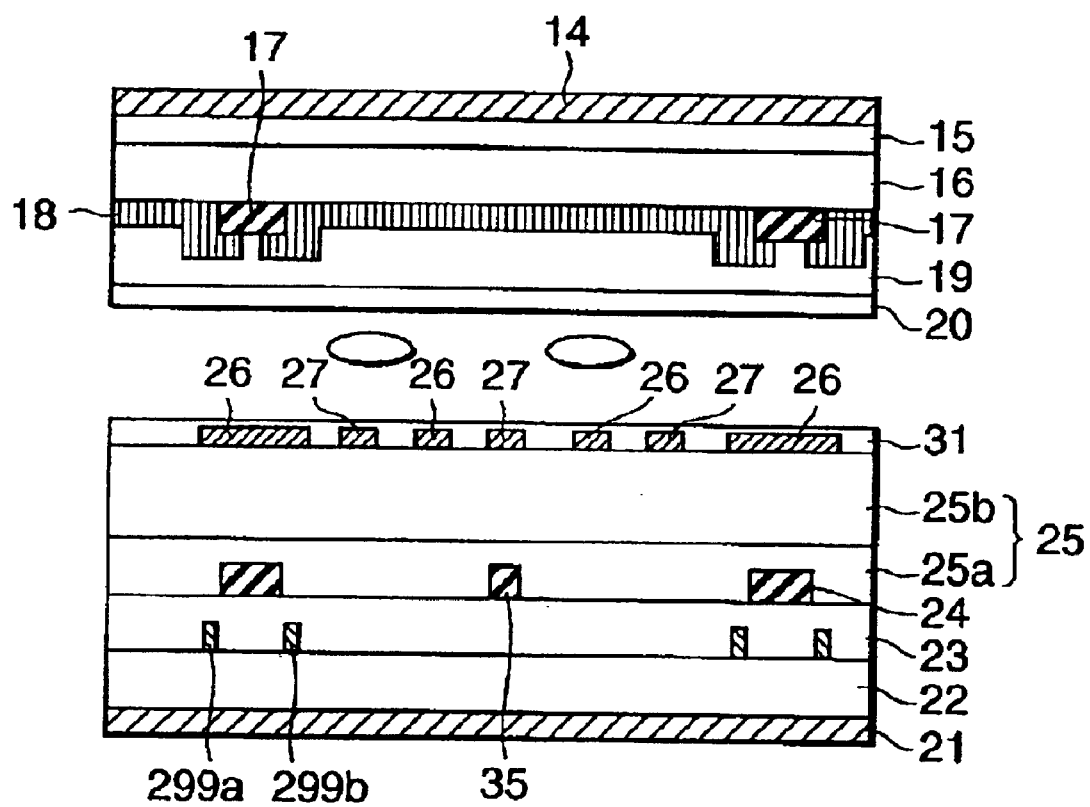
FIG. 8 is a cross section taken along a line A–A' in FIG. 7.
Figure 9:
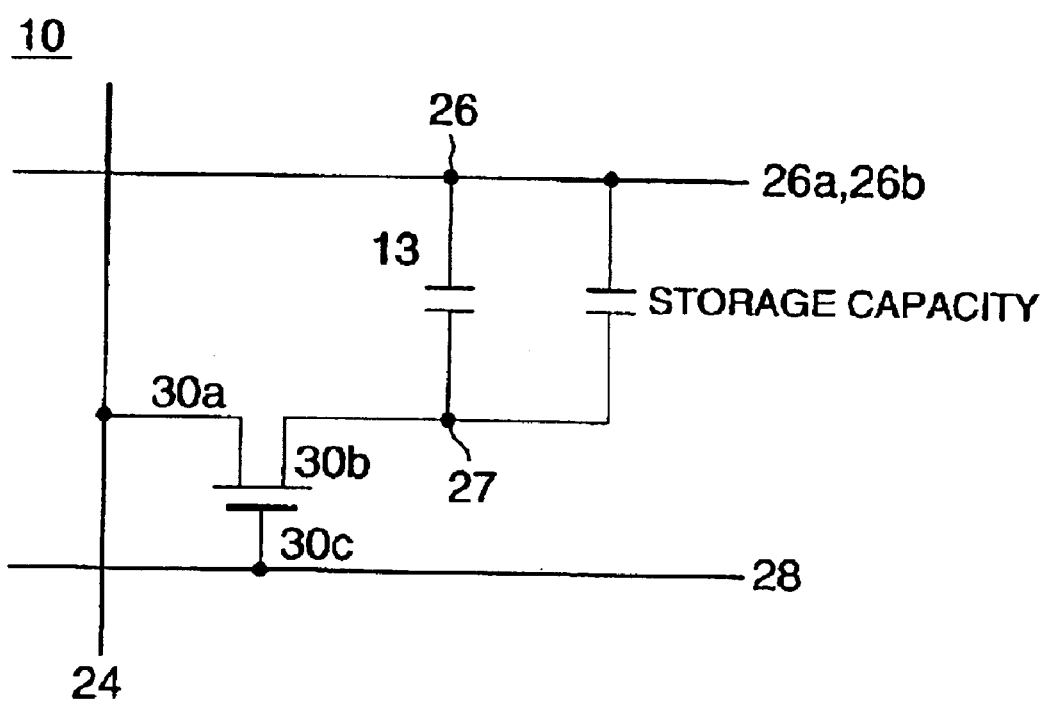
FIG. 9 is an equivalent circuit diagram of the unit pixel shown in FIG. 7.

Referring to FIG. 7 and FIG. 8, an IPS mode AMLCD 10 according to the present invention is constructed with an active element substrate 11, an opposing substrate 12 and a liquid crystal layer 13 held between the active element substrate 11 and the opposing substrate 12.

The opposing substrate 12 is composed of a transparent insulating substrate 16, a black matrix layer 17 formed on a surface of the transparent insulating substrate 16 as a light shielding film, a color layer 18 overlapped partially on the black matrix layer 17 and a transparent overcoat film 19 formed on the black matrix layer 17 and the color layer 18. Further, in order to prevent electric charges produced by such as touching from a surface of the liquid crystal display panel from electrically influencing the liquid crystal layer 13, a transparent, electrically conductive layer 15 is formed on a surface of the transparent insulating substrate 16. The color layer 18 is formed of a resin film containing red (R), green (G) and blue (B) color dyes or pigments.

The active element substrate 11 is composed of a transparent insulating substrate 22, a first metal layer forming a scanning line 28 and a gate electrode 30c formed on the transparent insulating substrate 22, a first interlayer insulating film 23 formed on the first metal layer, a land shaped amorphous silicon film formed on the first interlayer insulating film 23, a second metal layer forming a data line 24 and a source electrode 30b and a drain electrode 30a of a TFT 50, a first film 25a of the second interlayer insulating film formed thereon, a second film 25b of the second interlayer insulating film formed on the first film 25a and a common electrode 26 and a pixel electrode 27, which are formed of a transparent electrode material on the second film 25b.

A pixel auxiliary electrode 35 to be described later is formed on the first interlayer insulating film 23 together with the data line 24. The data line 24 and the pixel auxiliary electrode 35 are formed by the second metal layer.

In this description, layers on the active element substrate 11 as well as the opposing substrate 12, which are closer to the liquid crystal layer 13, will be referred to as upper layers and layers, which are remoter from the liquid crystal layer 13, will be referred to as lower layers.

An alignment layer 31 and an alignment layer 20 are formed on a surface of the active element substrate 11 and a surface of the opposing substrate 12, respectively. The liquid crystal layer 13 is rubbed such that liquid crystal molecules are homogeneously oriented in a predetermined direction tilted by about 10 to 30 degrees with respect to the extending direction of the pixel electrode 27 and the common electrode 26 as shown in FIG. 7 and the alignment layers 31 and 20 of the active element substrate 11 and the opposing substrate 12 are bonded to surfaces of the liquid crystal layer 13. The above mentioned tilting angle is referred to as initial orientation direction of liquid crystal molecule.

A spacer (not shown) for maintaining a thickness of the liquid crystal layer 13 is arranged between the active element substrate 11 and the opposing substrate 12 and a seal (not shown) for preventing liquid crystal molecules from leaking out is formed around the liquid crystal layer 13.

Since the black matrix layer 17 functions to shield light leaking out from adjacent pixels in a region in which the black matrix layer 17 overlapped with the data line 24, width of the black matrix layer 17 is smaller than that of the common electrode 26 formed of a transparent electrode material and completely covering the data line 24 so that light transmitting through the common electrode is not blocked.

As shown in FIG. 7, the data line 24 for supplying data signal, the common electrode wiring portions 26a and 26b and the common electrode 26 to which the reference potential is applied, the pixel electrode corresponding to a pixel to be displayed, the scanning line 28 to which a scan signal is supplied and the TFT 50, etc., are provided on the active element substrate 11.

The TFT 50 includes the gate electrode 30c, the drain electrode 30a and the source electrode 30b and is provided in the vicinity of a cross point of the scanning line 28 and the data line 24 correspondingly to each pixel. The gate electrode 30c, the drain electrode 30a and the source electrode 30b are electrically connected to the scanning line 28, the data line 24 and the pixel electrode 27, respectively.

The common electrode 26 and the pixel electrode 27 have comb configurations, respectively, and the comb teeth of the respective electrodes extend in parallel to the data line 24. Further, the comb teeth of the common electrode 26 and the comb teeth of the pixel electrode 27 are interleaved mutually.

Further, as shown in FIG. 7, the common electrode 26 formed of the transparent electrode material is connected to the common electrode wiring portion 26b through a common electrode contact hole 39a.

Figure 10A:
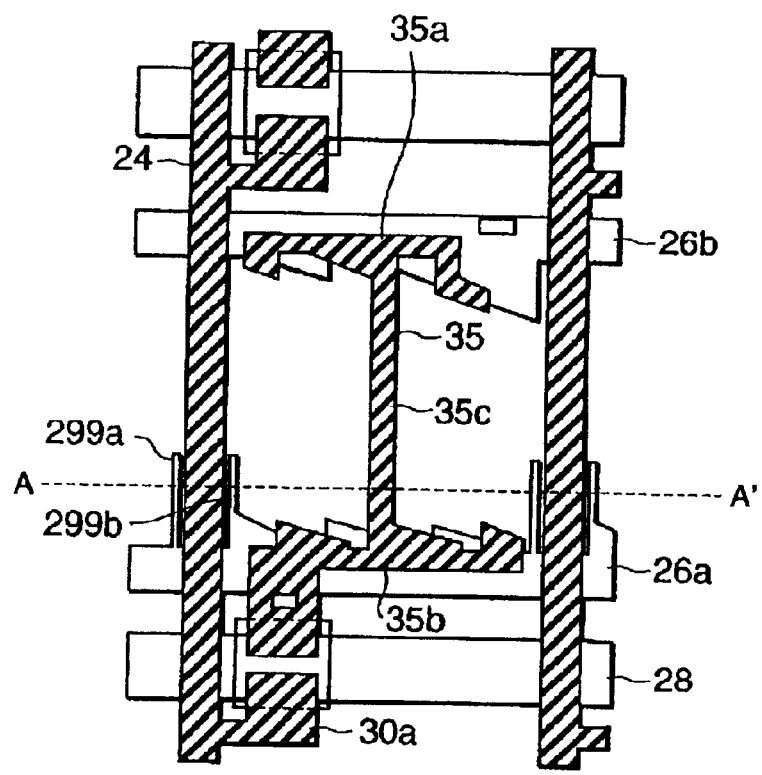
FIG. 10A is a plan view of a region in which a first metal layer and a second metal layer shown in FIG. 7 are formed.
Figure 10B:
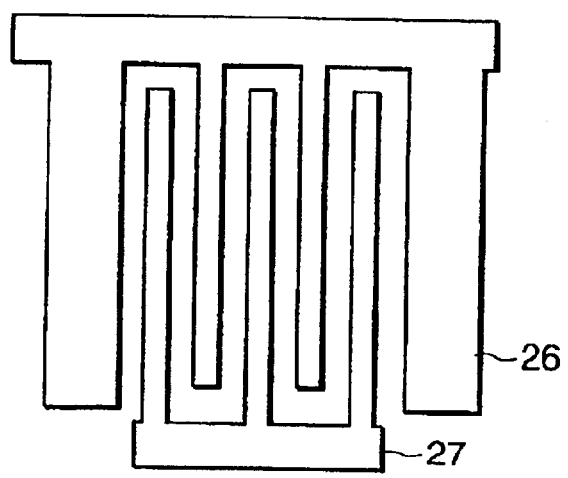
FIG. 10B is a plan view of a region in which a transparent electrode (ITO) shown in FIG. 7 is formed and shows a pattern overlapped on an upper portion in FIG. 10A.

FIG. 10A and FIG. 10B are plan views showing the common electrode 26 and the pixel electrode 27shown in FIG. 7 separately to distinguish one formed of the transparent electrode material from the other.

Figure 11:
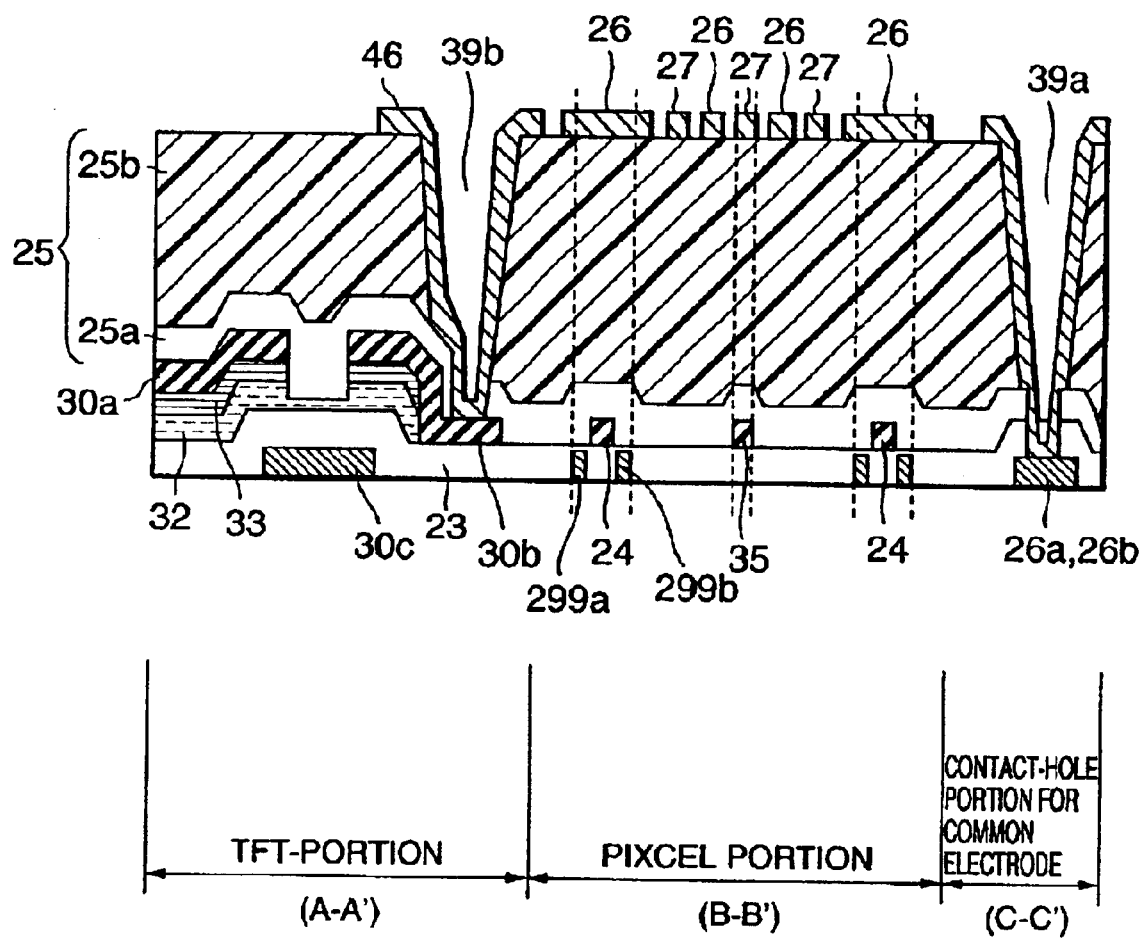
FIG. 11 shows cross sections of a TFT substrate side of the unit pixel in the present invention, taken along lines A–A', B–B' and C–C' in FIG. 12.

Further, FIG. 11 shows the TFT element portion, the unit pixel portion and the common electrode contact hole portion of the unit pixel portion of the liquid crystal display device 10 according to this embodiment together. The respective portions are shown as cross sections basically taken along lines A–A', B–B' and C–C' in the FIG. 7.

FIG. 11 shows a case where the second interlayer insulating film 25 is a lamination of the first film 25a and the second film 25b. When the second interlayer insulating film 25 has a single layer structure, it may be considered that the first film is a lower layer of the second interlayer insulating film and the second film of the second interlayer insulating film is an upper layer of the second interlayer insulating film.

The common electrode wiring portions 26b and 26a are formed by the first metal layer and extend in parallel to the scanning line and a peripheral portion of the common electrode wiring is connected to a common electrode potential, as shown in FIG. 11 and FIG. 7.

Protrusions 299a and 299b are formed in at least one of the common electrode wiring portions 26a and 26b such that the data line 24 to be formed in a later step is put therebetween along the extending direction of the data line.

The pixel electrode 27 formed of the transparent electrode material is formed by a second metal layer and connected to the pixel auxiliary electrode 35 integrally formed with the source 30b of the TFT 50 through the pixel electrode contact hole 39b, as shown in FIG. 7.

In the IPS mode AMLCD 10, a predetermined display is performed by generating electric field parallel to the transparent insulating substrates 16 and 22 between the common electrode 26 and the pixel electrode 27 of a pixel, which is selected by the scan signal supplied through the scanning line and written in with a data signal supplied through the data line 24, and rotating orientation direction of liquid crystal molecule in a plane parallel to the transparent insulating substrates 16 and 22 according to the electric field. In FIG. 10B, narrow vertical regions surrounded by the comb teeth of the common electrode 26 and the comb teeth of the pixel electrode 27 are referred to as "columns". In the present liquid crystal display device 10, the common electrode 26 and the pixel electrode 27 are formed of ITO (Indium Tin Oxide), which is a transparent electrically conductive material.

In the present AMLCD 10, the pixel auxiliary electrode 35 integrally formed with the source electrode 30b of the TFT 50, which is formed by the second metal layer on the first interlayer insulating film 23, may be provided below the second interlayer insulating film 25 as shown in FIG. 10A and FIG. 11.

As shown in FIG. 10A, the pixel auxiliary electrode 35 includes a first portion 35a on the common electrode wiring portion 26b formed by the first metal layer to form a storage capacitor, a second portion 35b on the common electrode wiring portion 26a formed by the first metal layer to form a storage capacitor and a third portion 35c, which extends in parallel to the data line 24, is positioned below the pixel electrode 27 formed on the second interlayer insulating film 25 by a transparent metal and connects the first portion 35a and the second portion 35b together and the first, second and third portions constitute a letter "I" shape.

The first, second and third portions 35a, 35b and 35c of the pixel auxiliary electrode 35 are formed on the first interlayer insulating film 23 by the second metal layer, which is formed of an opaque metal. As will be clear from FIG. 17, the drain electrode 30a and the source electrode 30c of the TFT 50 are formed by the second metal layer and the source electrode 30b of the TFT is connected to the pixel auxiliary electrode 35. By forming the pixel auxiliary electrode 35 of the opaque metal, transmittivity may be lowered to some extent. However, by connecting the pixel auxiliary electrodes 35 mutually, it is possible to form the storage capacitances on both sides of the pixels, so that the display can be stabilized since a total storage capacitance becomes large.

Incidentally, the configuration of the pixel auxiliary electrode 35 is not limited to that shown in FIG. 10 and may be any, provided that it is positioned below the pixel electrode 27. Although not shown in FIG. 10A, it may be possible to form a common auxiliary electrode on the first interlayer insulating film 23 shown in FIG. 11 by the second metal layer similarly to the pixel auxiliary electrode 35 and connect the common electrode wiring portions 26a and 26b formed by the first metal layer and the common electrode 26 together thereby.

As is clear from FIG. 11, the gate electrode 30c of the TFT 50 is formed by the first metal layer. Since it is possible, by connecting the common electrodes 26 mutually, to form the storage capacitances on both sides of the pixels, the storage capacitance can be made large and the display can be stabilized.

Figure 13:
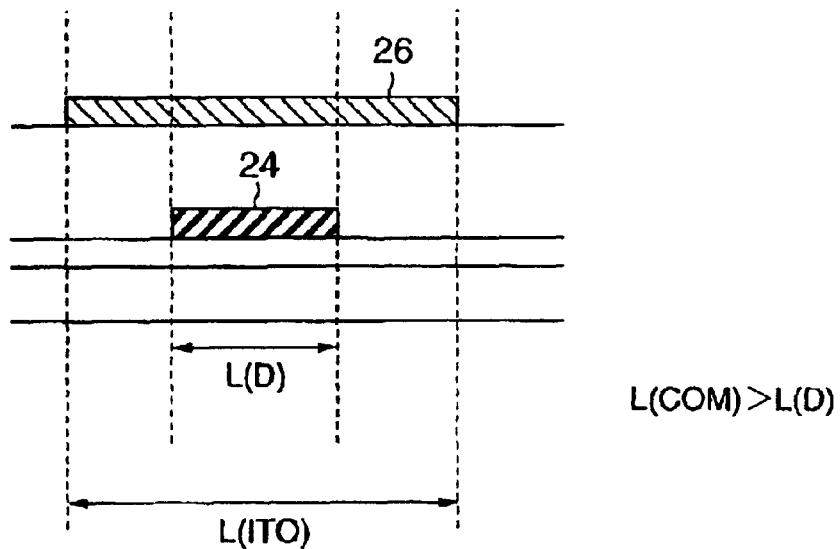
FIG. 13 is a partial cross section of the unit pixel, showing a relation in width between a data line and a common electrode.

As shown in FIG. 7 and FIG. 8, the common electrode 26 is formed in the layer higher than the data line 24 and completely covers the data line 24 except the region thereof in which the data line 24 and the scanning line 28 cross each other and the region in the vicinity of the cross region. That is, as shown in FIG. 13, L(COM)>L(D) is established, where L(COM) is width of the common electrode 26 and L(D) is width of the data line 24, and the width L(D) is within the width L(COM). In FIG. 7, since the region in which the data line 24 and the scanning line 28 cross each other and the region in the vicinity of the cross region include large step portions, the common electrode 26 does not cover the data line 24 in these regions in order to prevent short-circuit.

Figure 14:
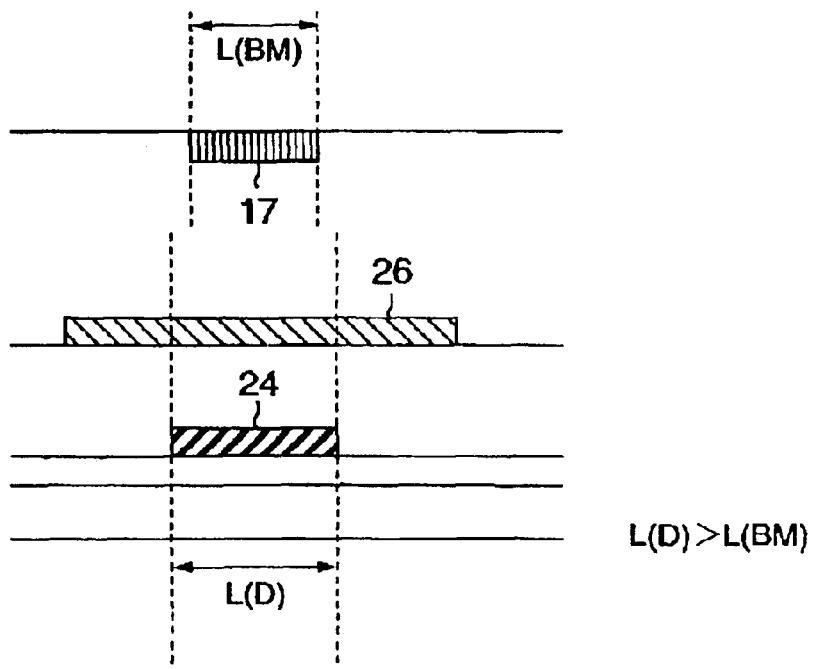
FIG. 14 is a partial cross section of the unit pixel, showing a relation in width between the data line and a black matrix layer.

As described above, the width of the black matrix layer 17 on the data line 24 is set smaller than the width of the common electrode 26 and there is no light shielding film between the common electrode 26 and the pixel electrode 27 adjacent to the common electrode 26 in plan view. Further, the black matrix layer 17 is narrower than the data line 24 and overlaps with the data line 24 in the whole region thereof. That is, as shown in FIG. 14, L(D)>L(BM) is established, where L(BM) is the width of the black matrix layer 17, and L(BM) is included within L(D).

Since the width of the black matrix layer 17 is smaller than the width of the data line 24, light transmitted through bulging portions of the transparent common electrode 26 covering the data line 24 can be utilized completely, so that the transmittivity of the panel can be further improved.

In this embodiment, the black matrix layer 17 is 6 μm wide. However, the width of the black matrix layer 17 is not limited thereto and, preferably, larger than 6 μm. When the width of the black matrix layer 17 is smaller than 6 μm, reflection from the data line 24 becomes large and, therefore, an image displayed on the display panel may become unclear in a bright environment.

Incidentally, the common electrode 26 may be formed of a material, which is the same as a material coating terminals of the present liquid crystal display device 10. That is, it is possible to form the terminals in the same ITO layer of the common electrode 26 like the contact hole 39a shown in FIG. 11.

Therefore, the common electrode 26 can be formed in the same manufacturing step and of the same material as those of the terminals portion of the present liquid crystal display device 10 and, hence, it is possible to prevent an increase of the number of steps due to formation of the common electrode 26.

Further, in the present AMLCD 10, when the common electrode 26 does not cover the data line 24 completely in the plan view, the common electrode 26 can not shield electric field from the data line 24. Therefore, electric field is generated between the data line 24 and the adjacent pixel electrode 27, causing an erroneous operation of liquid crystal in that area. That is, liquid crystal in that area performs an operation, which is not defined by a potential difference between the common electrode 26 and the pixel electrode 27, causing vertical cross-talk.

When there is the black matrix layer 17 in the opposing substrate 12 and the width of the black matrix layer 17 is sufficiently large to cover the data line 24, it may be enough to shield the erroneous operation region against a viewer. On the other hand, when the black matrix layer 17 of the opposing substrate 12 does not cover the data line 24, it is possible to shield the erroneous operation region against a viewer by providing a light shielding layer connected to the common electrode 26 below the data line 24 to shield light from a back light. If this light shielding layer is not connected to the common electrode 26, the potential thereof becomes unstable and, as a result, DC electric field may be generated between the pixel electrode 27 and the common electrode 26 or an erroneous operation such as cross-talk may occur.

In more detail, a light shielding layer connected to the common electrode wiring portion 26a through the first metal layer forming the scanning line 28 is formed. Since the common electrode wiring portions 26a and 26b are connected to the common electrode 26 through the contact-hole 39a, the common electrode wiring portions 26a and 26b may be used as a light shielding layer. The light shielding layer may be constructed as a single layer of, for example, chromium, titanium, molybdenum, tungsten or aluminum or a lamination of layers of these metals. When the laminated light shielding layer structure is used, it is possible to reduce an electric resistance thereof.

In the plan view shown in FIG. 7, the common electrode 26 does not cover the data line 24 in the region in which the data line 24 and the scanning line 28 cross each other and the region in the vicinity thereof. Therefore, the common electrode 26 can not shield electric field of the data line 24 in the region in which it crosses the scanning line 28. Consequently, electric field is generated between the data line 24 and the adjacent pixel electrode 27, causing erroneous operation of liquid crystal. Further, liquid crystal may erroneously operate by electric field of the scanning line 28.

However, since the common electrode wiring portions 26a and 26b are formed in the first metal layer forming the scanning line 28, it is impossible to shield the erroneously operable regions by the common electrode wiring portions 26a and 26b. in view of this, it is preferable to shield these erroneously operable regions by the black matrix layer 17 provided on the side of the opposing substrate.

Figure 15:
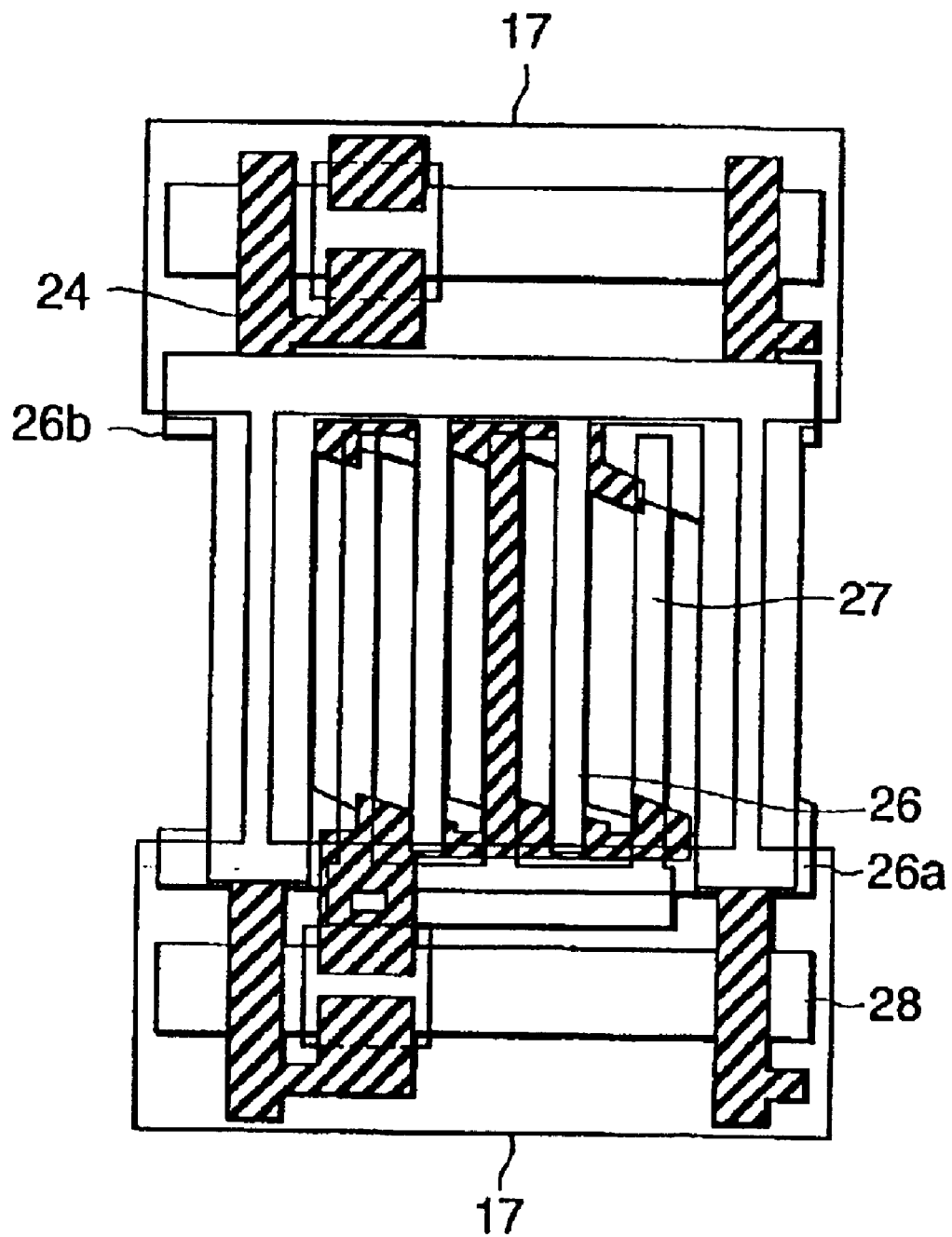
FIG. 15 is a plan view showing a region of an opposing substrate shown in FIG. 7, in which the black matrix layer is formed.

FIG. 15 shows an example of the above mentioned structure. In FIG. 15, by covering the scanning line 28 and a region in the vicinity thereof by the black matrix layer 17, a region between the scanning line 28 and the pixel electrode 27 and a region in the vicinity thereof, which are defined by thick solid lines, are shielded.

The common electrode 26 in the present AMLCD 10 is formed of ITO, which is a transparent, electrically conductive material. Therefore, the area of the transparent region in the present liquid crystal display device 10 is increased, so that it is possible to improve the aperture ratio.

Although sheet resistance of the ITO film is as large as about 100 Ω/□, it is possible to reduce the resistance of a whole wiring of the common electrodes and provide redundancy thereof by laterally connecting the common electrodes 26 formed by the ITO layer.

As shown in FIG. 8, the second interlayer insulating film 25 is provided between the common electrode 26 and the data line 24. It is possible to reduce parasitic capacitance between the data line 24 and the common electrode 26 by selecting d/ε sufficiently large, where d is thickness of the second interlayer insulating film 25 and ε is dielectric constant thereof.

Further, since the longitudinal cross-talk is restricted, it is unnecessary to form a black matrix layer for preventing defective display caused by electric field leakage from the data line 24. Therefore, since it is enough to form the black matrix layer 17 for only improving contrast, it is possible to reduce the width of the black matrix layer 17. With the reduction of the width of the black matrix layer 17, it is possible to make the aperture ratio of the present liquid crystal display device 10 larger.

Further, in the present AMLCD 10, the common electrode 26 and the pixel electrode 27 are formed on the second interlayer insulating film 25. By forming the common electrode 26 and the pixel electrode 27 in the same layer, it is possible to form the common electrode 26 and the pixel electrode 27 of the same material in the same step and, therefore, it is possible to improve the manufacturing efficiency.

As mentioned above, in the present AMLCD 10, the common electrode 26 shielding the data line 24 is formed of ITO. Therefore, it is possible to improve the reliability of the present liquid crystal display device 10, compared with a case where the common electrode 26 is formed of another metal. The reason for this will be described.

Figure 16:
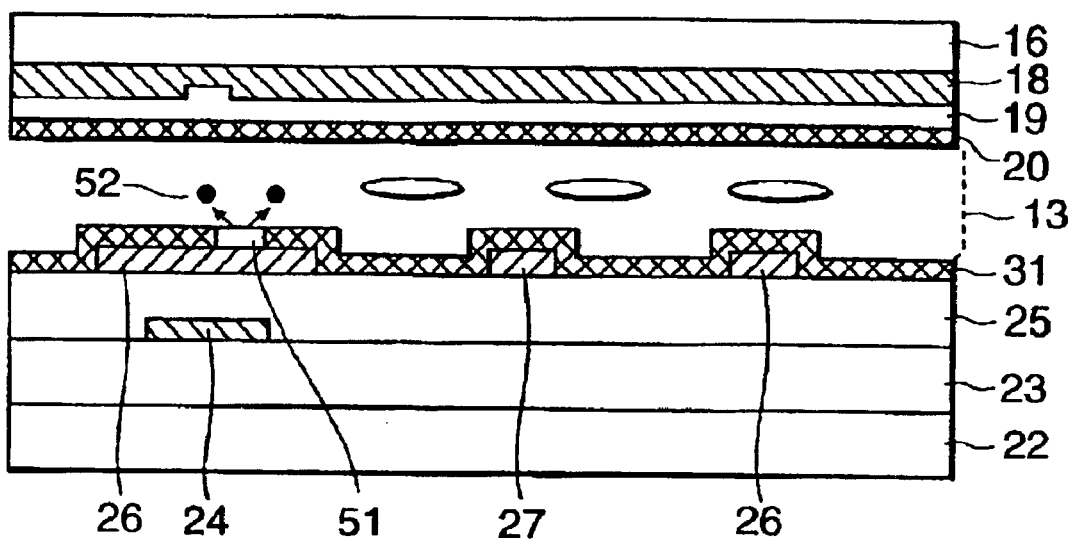
FIG. 16 is a partial cross section of the liquid crystal display device according to the present invention, for explaining a merit when the common electrode is a transparent electrode (ITO)

As shown in FIG. 16, the common electrode 26 and the pixel electrode 27 are formed of other metal than ITO on the second interlayer insulating film 25 and an alignment layer 31 covering the common electrode 26 and the pixel electrode 27 and having thickness of 50 to 100 nm is formed on the second interlayer insulating film 25.

If there is a pin hole 51 in the alignment layer 31, liquid crystal material forming the liquid crystal layer 13 and the metal forming the common electrode 26 and the pixel electrode 27 are electrochemically reacted through the pin hole 51 to ionize the metal forming the common electrode and the pixel electrode and ions 52 thus produced may be eluted into the liquid crystal layer 13. Such elution of the metal ions 52 into the liquid crystal layer 13 becomes a cause of the display variation of the liquid crystal display device.

Particularly, when the liquid crystal layer 13 is formed of a liquid crystal material having strong polarity, the elution of the metal ions 52 into the liquid crystal layer 13 becomes substantial. Since, in the IPS mode liquid crystal display device, it is necessary to use a liquid crystal material having large dielectric constant anisotropy Δε, the elution of the metal ions 52 is particularly severe.

Therefore, the common electrode 26 and the pixel electrode 27 provided in contact with the alignment layer 31 should be formed of a material, which is stable with respect to the electrochemical reaction with the liquid crystal material, that is, a material having reactivity with the liquid crystal material is low.

ITO is a very stable material in such electrochemical reaction as proved by the fact that it has been used as a transparent electrode material in the TN (Twisted Nematic) and the STN (Super Twisted Nematic) type liquid crystal display devices. Therefore, the common electrode 26 and the pixel electrode 27 formed of ITO can be used in directly contact with the alignment layer 31 and can improve the reliability of the present liquid crystal display device 10, compared with the case where the common electrode 26 and the pixel electrode 27 are formed of other metal than ITO.

In the present AMLCD 10, the common electrode 26 is formed to completely cover the data line 24 in almost all regions. It is preferable that the common electrode 26 has aprons each 1.5 μm wide or more on both sides of the data line 24.

The second interlayer insulating film 25 of the present liquid crystal display device 10 is 1 to 2 μm thick. Further, the second interlayer insulating film 25 may be formed by a single layer film of inorganic or organic material.

Alternatively, the second interlayer insulating film 25 may take a lamination structure including a first film of inorganic material and a second film of organic material covering the first film, as shown in FIG. 11.

Since dielectric constant of the organic film is lower than that of the inorganic film, it is possible to reduce dielectric constant of the whole interlayer insulating film having the lamination structure, compared with the case where the interlayer insulating film has the single layer structure.

Further, when the interlayer insulating film is constructed with a single organic film, an interface between the semiconductor layer of the TFT and the organic film covering the semiconductor layer becomes unstable and, when it is driven at high temperature, leak current of the TFT is increased, causing display variation. By using an inorganic film such as a silicon nitride film as the first film in contact with the semiconductor layer of the TFT and laminating an organic film on the inorganic film, a stable interface between the inorganic film and the semiconductor layer is formed, so that a problem such as mentioned above can be restricted.

Examples of inorganic and organic films are shown in Table 1 below.

TABLE 1

| | | Film thickness | Dielectric constant | Film forming method | Configuration forming method |
|---|---|---|---|---|---|
| (1) only inorganic film | SiNx film | 1~3 μm | 6.4 | Plasma CVD | Dry etching using photo resist as mask |
| (1) only inorganic film | SiNx film/ SiOx film | 1 μm/ 0.5 μm | 6.4/ 4.0 | Plasma CVD/ sputtering | Dry etching using photo resist as mask |
| (1) only inorganic film | Inorganic polysilazane film | 1~2 μm | 4.5 | Spin coating & sintering | Dry etching using photo resist as mask |
| (1) only inorganic film | SiNx/ inorganic polysilazane film | 0.15 μm/ 1~2 μm | 6.4/ 4.5 | Plasma CVD/ spin coating & sintering | Dry etching using photo resist as mask |
| (2) inorganic film/organic film lamination | SiNx film/ photosensitive acrylic resin film | 0.15 μm/ 1~2 μm | 6.4/ 3.3 | Plasma CVD/ spin coating | Sintering photosensitive acrylic resin after pattern formation by exposure and development/dry etching of SiNx |
| (2) inorganic film/organic film lamination | SiNx film/ photosensitive acrylic resin film | 0.15 μm/ 1~2 μm | 6.4/ — | Plasma CVD/ spin coating | Sintering photosensitive acrylic resin after pattern formation by exposure and development/dry etching of SiNx |
| (2) inorganic film/organic film lamination | | | | | |
| (3) only organic film | BCB (benzocyclobutene) film | 1~2 μm | 4.5 | Spin coating & sintering | Dry etching using photo resist as mask |
| (3) only organic film | Organic polysilazane film | 1~2 μm | 3.8 | Spin coating & sintering | Dry etching using photo resist as mask |
| (3) only organic film | Siloxane film | 1~2 μm | — | Spin coating & sintering | Dry etching using photo resist as mask |

As shown in Table 1, in the case where the second interlayer insulating film 25 is a single layer of inorganic film, the inorganic film may be selected from a group consisting of a SiNx (silicon nitride) film, an inorganic polysilazane film, a lamination film of a silicon nitride film and a silicon oxide film and a lamination film of a silicon nitride film and an inorganic polysilazane film.

In the case where the second interlayer insulating film 25 is a single layer of organic film, the organic film may be selected from a group consisting of a BCB (benzocyclobutene) film, an organic polysilazane film and a siloxane film.

Further, in the case where the second interlayer insulating film is a lamination of the first and second films, the first film may be a silicon nitride film and the second film may be a photosensitive acrylic resin film or a photosensitive polyimide resin film.

Incidentally, in the Table 1, thickness of the inorganic film in the case where the second interlayer insulating film 25 is the lamination is 0.15 μm. However, the film thickness is not limited thereto. A preferable thickness range of the inorganic film is from about 0.1 μm to about 1.0 μm.

Further, it should be noted that the thickness values of the respective films shown in the Table 1 are mere examples and not limited to the shown values.

Since the common electrode 26 is formed of a transparent material, the transparent area of the panel is increased by an area of the region occupied by the common electrode 26 and it is possible to improve the aperture ratio of the present liquid crystal display device 10.

Further, it is possible to form the common electrode wiring portion 26a on the lower side of the unit element and to form the common electrode wiring portion 26b on the upper side of the unit element. By forming the common electrode wiring portions 26a and 26b on the lower and upper sides of the unit element, respectively, it is possible to increase the storage capacitance, compared with the case where the common electrode wiring is formed on either of the upper and lower sides of the unit element.

Figure 17:
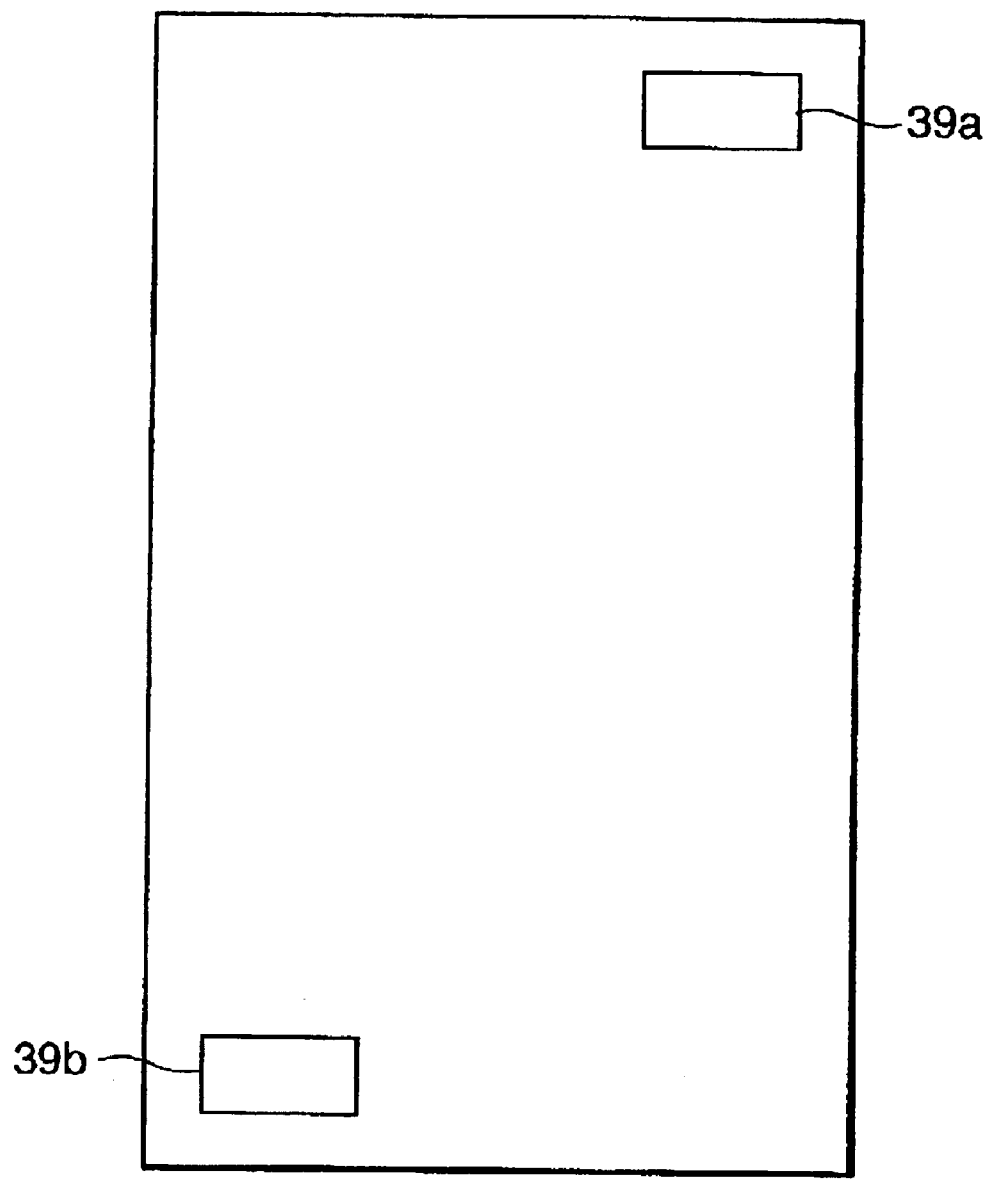
FIG. 17 is a plan view illustrating an arrangement of contact holes of the liquid crystal display device according to the present invention.

When the TFT 50 is arranged on the lower side of the unit pixel as in the case of the present liquid crystal display device 10, it is possible to connect the pixel electrode 27 to the drain layer forming the drain electrode 30a on the lower side of the unit element through the contact hole 39b and to connect the common electrode 26 to the common electrode wiring portion 26b on the upper side of the unit element through the contact hole 39a, as shown in FIG. 17.

By connecting the common electrode 26 to the common electrode wiring portions 26a and 26b through the contact holes 39a and 39b, respectively, every unit pixel in this manner, it is possible to reduce the resistance of the whole wiring of the common electrode 26.

Now, a manufacturing method for manufacturing the liquid crystal display device 10 according to this embodiment will be described with reference to FIG. 18A to FIG. 18K.

Figure 12:
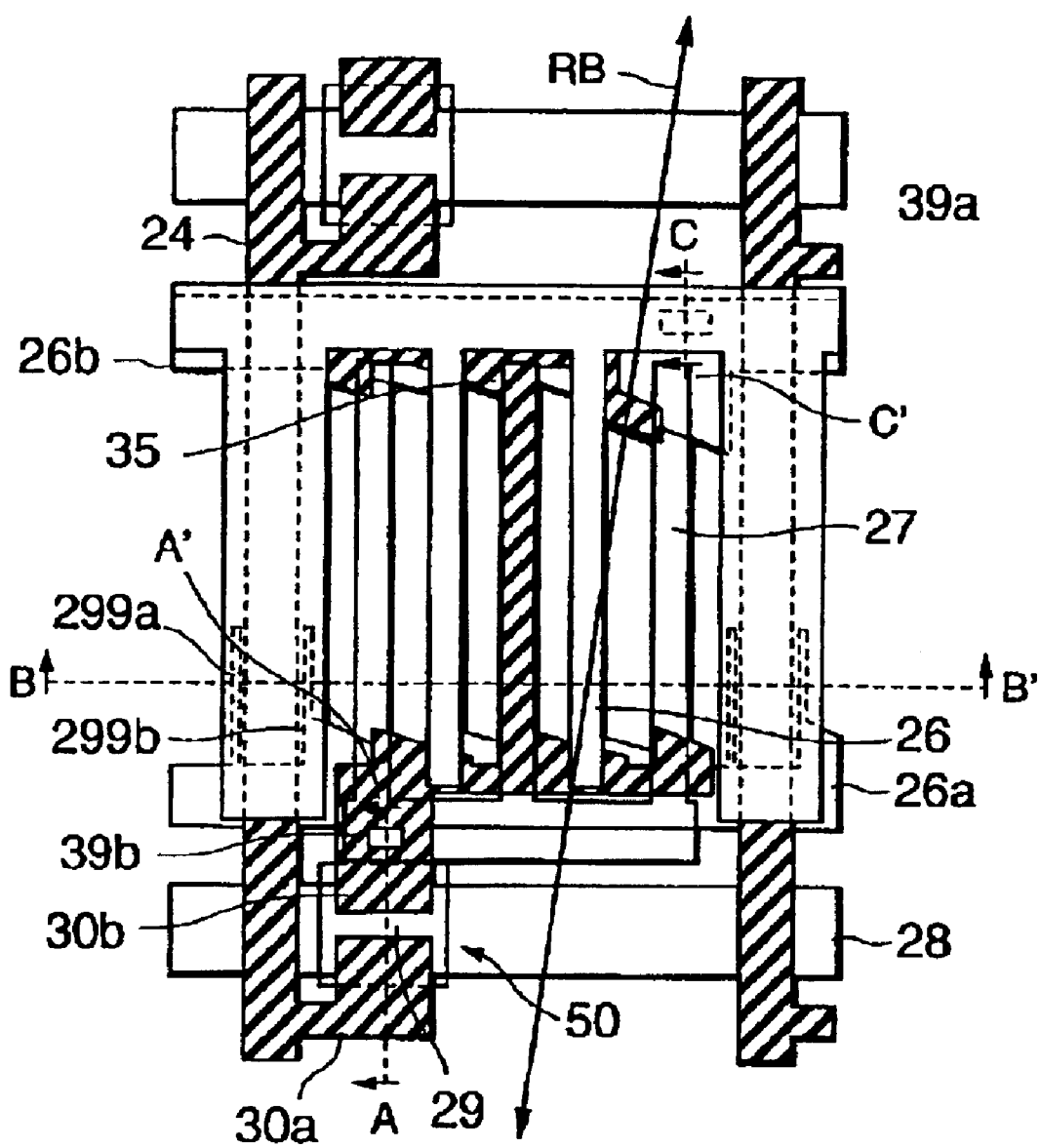
FIG. 12 corresponds to FIG. 7 and is a plan view of the portions of the TFT substrate side shown in FIG. 11.

In these figures, the second interlayer insulating film 25 takes in the form of a lamination of an inorganic film and an organic film and the TFT element portion, the unit pixel portion and the contact hole portion of the common electrode, which have the structures shown by the cross sections taken along the lines A–A', B–B' and C–C' in FIG. 12, are shown as being formed in one region.

The protruded portions 299a and 299b of the common electrode wiring are formed in the same layer as that of the scanning line, which is formed initially by photolithography, such that the protruded portions extend along the extending direction of at least one of the common electrode wiring portions 26a and 26b on both sides of the data line 24, which is formed in a later step.

Therefore, in order to improve the positional accuracy in the lateral direction in the exposure of the second and subsequent layers, it is possible to utilize the protruded portions 299a and 299b of the common electrode wiring as a reference in measuring the overlapping condition of the resist pattern in the lateral direction by the fine distance measuring device, after a test exposure is performed.

When there is no such protruded portions, there is no pattern, which is used as a reference for the fine distance measurement in the lateral direction, in the pattern of the first layer. Therefore, it is impossible to perform the lateral alignment precisely and the divisional variation tends to occur. On the contrary, with the existence of the protruded portions 299a and 299b, it is possible to precisely perform the exposure for the second and subsequent layers with respect to the pattern of the first layer to thereby obtain a good display without divisional variation.

Since the potential of the protruded portions 299a and 299b is fixed to that of the common electrode, the electrically characteristics thereof is stable and so the problem of the degradation of display due to DC electric field generated in the display region is solved.

As mentioned above, it is possible to provide a liquid crystal display device, which is highly reliable, has a high aperture ratio and a large viewing angle, according to the present invention.

The present invention will be described in more detail with reference to preferred embodiments thereof.

FIRST EMBODIMENT

In a first embodiment, the second interlayer insulating film 25 is a lamination of the inorganic film and an organic film.

Figure 18G:
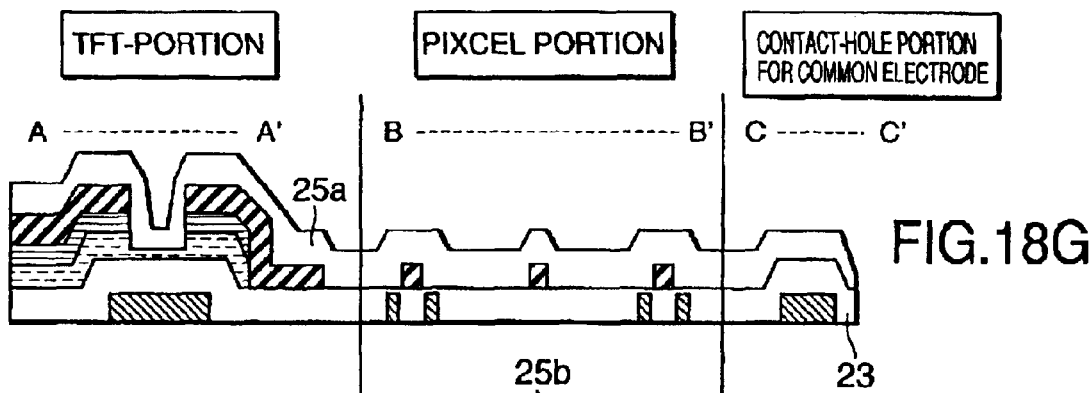

As shown in FIG. 18A, the gate electrode 30c and the common electrode wiring portions 26a and 26b are formed by patterning the first metal layer formed of chromium on the transparent insulating substrate 22 of glass by photolithography and dry etching. Although only the common electrode wiring portion 26b is shown in FIG. 18A to FIG. 18K, the common electrode wiring portion 26a, which is inevitable, will be described together in the following description.

The photolithography is performed by depositing a film to be patterned on a whole surface of the transparent insulating substrate 22, forming a photosensitive resin film on the whole surface of the deposited film by spin coating, exposing the photosensitive resin film with light having a specific wavelength with which the photosensitive organic film is hardened by using a photo mask shielding only a desired pattern and processing the organic film resist with a specific developer such that portions of the photosensitive organic film resist, which are not hardened, are removed. The film to be patterned is patterned by using the remaining portion of the hardened photosensitive organic film resist as a protective film for the film to be patterned and the desired pattern is formed by removing the resist by dipping it in a peeling liquid.

The protruded portions 299a and 299b of the common electrode wiring each being 2 $\mu$m wide or more in the extending direction parallel to the longitudinal direction of the data line and having a length in a range from 5 $\mu$m to the length of the aperture are formed in at least one of the common electrode wiring portions 26a and 26b such that the protruded portions extend along the extending direction of at least one of the common electrode wiring portions 26a and 26b on both sides of the data line 24, which is formed in a later step.

In this embodiment, each of the protruded portions 299a and 299b of the common electrode wiring will be described as being 2 $\mu$m wide and 20 $\mu$m long.

Thereafter, as shown in FIG. 18B, the first interlayer insulating film 23 in the form of a lamination of a silicon dioxide (SiO$_2$) film and a silicon nitride (SiNx) film is formed on the whole surface of the transparent insulating substrate 22 to cover the gate electrode 30c, the common electrode wiring portions 26a and 26b and the protruded portions 299a and 299b thereof.

And then, as shown in FIG. 18C, an amorphous silicon film composed of a a-Si film 32 and an n+a-Si film 33 is formed on the whole surface of the first interlayer insulating film 23.

Thereafter, as shown in FIG. 18D, the amorphous silicon film (32 and 33) is patterned by photolithography and dry etching to form a land-shaped semiconductor layer of the TFT.

The exposure of the amorphous silicon film (32 and 33) in the photolithography processing is performed by using a matching marker formed by the underlying first metal layer, which is the gate electrode 30c and the common electrode wiring portions 26a and 26b, as a reference.

Figure 19:
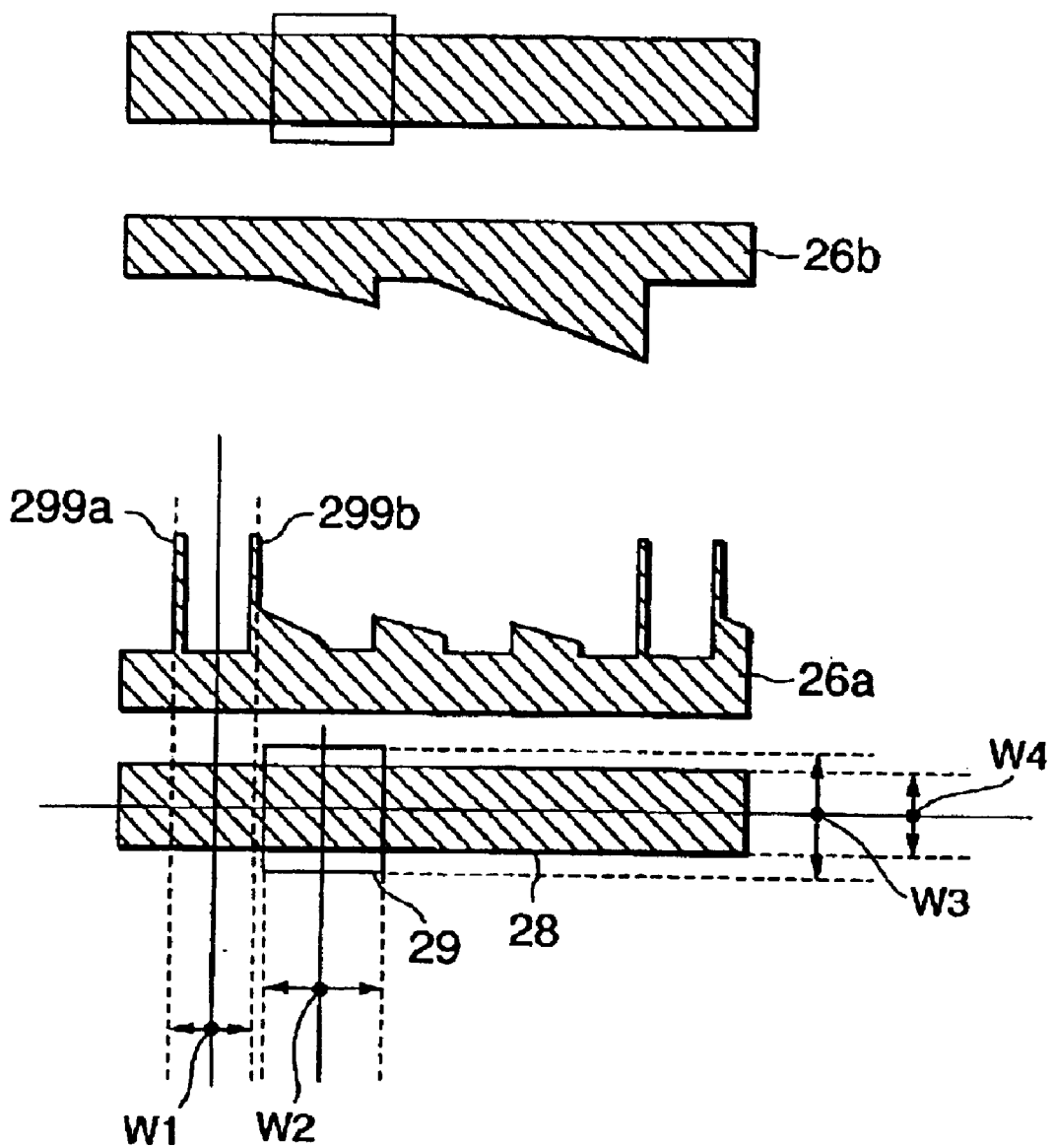
FIG. 19 illustrates a correction method for correcting an exposure patterning of an amorphous silicon layer with respect to a first metal layer in photolithography in the present invention.

Since the gate electrode 30c and the common electrode wiring portions 26a and 26b, which extend in the lateral direction, and the protruded portions 299a and 299b of the common electrode wiring, which extend in the vertical direction, exist in the underlying first metal layer, it is possible to measure a lateral and vertical deviations of the organic film resist pattern, which is left through the exposure step and the developing step of the amorphous silicon film (32 and 33), every exposure shot by measuring the vertical and lateral parallel lines by the fine distance measuring device with using the protruded portions as the markers, as shown in FIG. 19. That is, outside edges of the paired protruded portions 299a and 299b formed in the common electrode wiring portion 26b are finely measured to determine a center value W1 between the protruded portions. And then, edges of the organic film resist in the lateral direction with respect to the amorphous silicon film 29 is measured finely to determine a center value W2 of the amorphous silicon film 29 in the lateral direction. A correction of the deviations is performed for the exposure in the lateral direction on the basis of photo mask data containing these center values W1 and W2. Further, edges of the scanning line 28 are measured finely to determine a center value W3 of the scanning line. And then, edges of the organic film resist with respect to the amorphous silicon film 29 in the vertical direction are measured finely to determine a center value W4 of the amorphous silicon film 29 in the vertical direction. A correction of the deviations is performed for the exposure in the vertical direction on the basis of photo mask data containing these center values W3 and W4.

In order to restrict a reading error when a distance is measured accurately by the fine distance measuring device, a pattern having a width of 2 μm or more is necessary. Further, the length of the protruded portion must be 5 μm or more. The width of the protruded portion, which is 2 μm or more, is enough. However, when the width is too large, the area of the aperture may be shielded by the common electrode wiring, which is formed of opaque material. Therefore, the width of the protruded portion is preferably 10 μm or smaller. The length of the protruded portion, which is 5 μm or more, is enough. However, when the length is too large, it shields effective light transmitted through the common electrode wiring, which is of opaque material, and the parasitic capacitance with respect to the data line is increased, causing a display quality such as flicker and lateral cross-talk, etc., to be degraded. Therefore, the length of the protruded portion is not larger than the length of the aperture, preferably 20~40 μm.

Since, in this embodiment, the width and the length of the common electrode wiring (299a, 299b) are 2 μm and 20 μm, respectively, the reading error is not large.

In a case where the patterning of the amorphous silicon film is deviated with respect to the first metal layer every exposure shot, the resist, which is hardened, can be removed by dipping it in a peeling liquid. After the resist is removed, a precise pattern formation with respect to the underlying first metal layer can be done by forming a photosensitive organic film resist by spin coating again and correcting the exposure data on the basis of an information obtained by the fine distance measuring device.

Thereafter, a chromium layer is deposited on the whole surface as the second metal layer and is patterned by photolithography and dry etching to form the drain 30c and the source electrode 30b of the TFT 50, the data line 24 and the pixel auxiliary electrode 35, as shown in FIG. 18E.

As shown in FIG. 18E, the exposure of the drain electrode 30a and the source electrode 30b of the TFT 50, the data line 24 and the pixel auxiliary electrode 35, which are formed by the second metal layer, in photolithography is performed by using a matching marker formed by the underlying first metal layer, which is the gate electrode 30c and the common electrode wiring portions 26a and 26b, as a reference, similarly to that shown in FIG. 18D.

Figure 20:
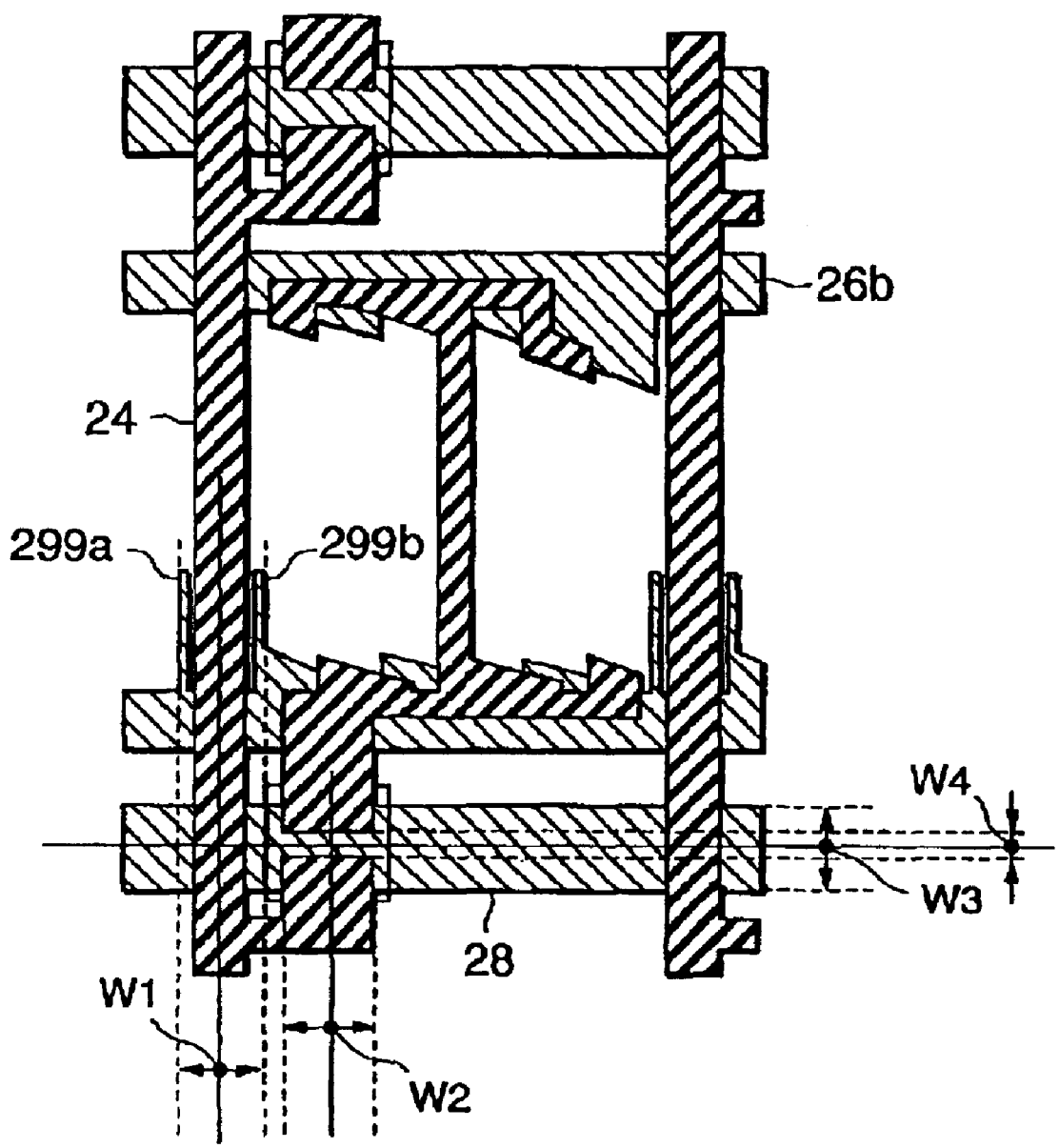
FIG. 20 illustrates a correction method for correcting an exposure patterning of a second metal layer with respect to the first metal layer in photolithography in the present invention.

Similarly to the patterning of the amorphous silicon film, since it is possible to measure a lateral and vertical deviations every exposure shot by measuring the vertical and lateral parallel lines such as shown in FIG. 20 by the fine distance measuring device, it is possible to perform a correct pattern formation with respect to the underlying first metal layer similarly to the patterning of the amorphous silicon film. That is, outside edges of the paired protruded portions 299a and 299b formed in the common electrode wiring portion 26b are finely measured to determine a center value W1 between the protruded portions. And then, edges of the organic film resist in the lateral direction with respect to the drain electrode 30a and the source electrode 30b formed by the second metal layer is measured finely to determine a center value W2 of the drain electrode 30a and the source electrode 30b in the lateral direction. A correction of the deviations is performed for the exposure in the lateral direction on the basis of photo mask data containing these center values W1 and W2. Further, edges of the scanning line 28 are measured finely to determine a center value W3 of the scanning line. And then, a distance between the drain electrode 30a and the source electrode 30b is measured finely to determine a center value W4 thereof. A correction of the deviations is performed for the exposure in the vertical direction on the basis of photo mask data containing these center values W3 and W4.

Thereafter, as shown in FIG. 18F, a channel of the TFT 50 is formed in the aperture between the drain electrode 30a and the source electrode 30b thereof by etching the n+type a-Si film 33 and the a-Si film 32 up to a middle level of the amorphous silicon film with using the drain electrode 30a and the source electrode 30b as a mask.

Thereafter, as shown in FIG. 18G, an inorganic first film 25a of the second interlayer insulating film 25, which is formed of silicon nitride, is deposited on the whole surface.

Figure 18H:
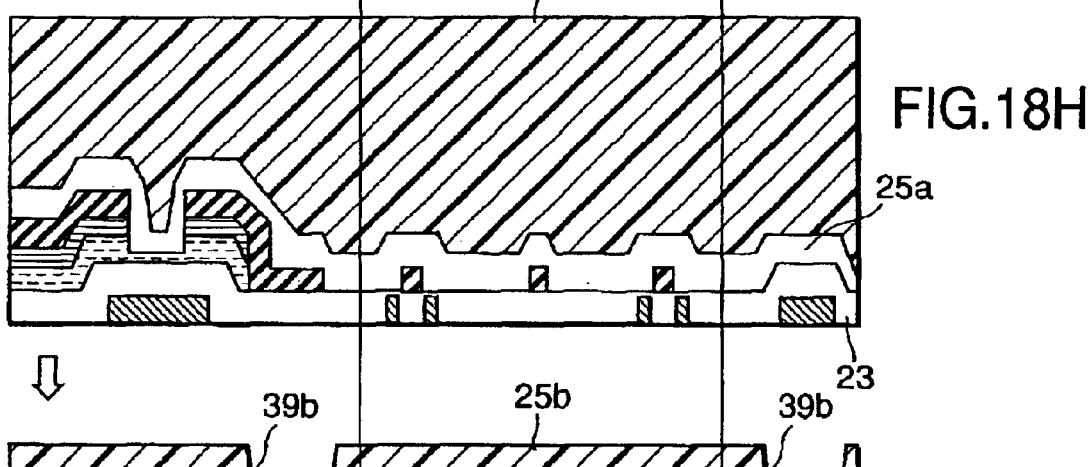

An then, as shown in FIG. 18H, an organic second film 25b of the second interlayer insulating film 25, which is formed of photosensitive acrylic resin, is deposited on the first film 25a.

Figure 18I:
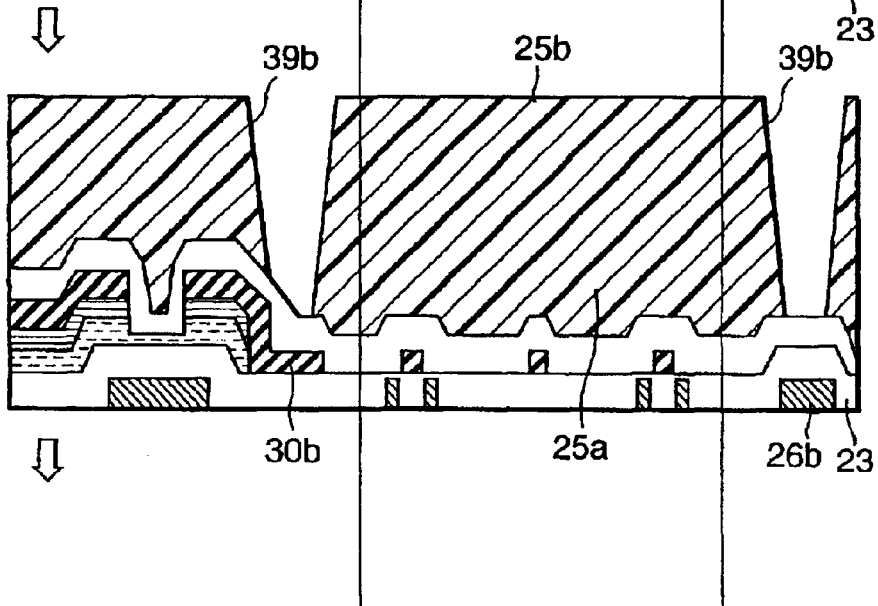

Thereafter, as shown in FIG. 18I, the photosensitive acrylic resin film 25b is exposed, developed and sintered and a contact hole 39b for the pixel electrode, which reaches the silicon nitride film of the first interlayer insulating film 23, and a contact hole 39a for the common electrode, which reaches the silicon nitride of the interlayer insulating film 23, are formed on the source electrode 30b and the common electrode wiring portion 26b, respectively.

The exposure of the photosensitive acrylic resin film as the second film 25b of the second interlayer insulating film 25 in the photolithographic processing is performed by using the matching marker of the first metal layer or the matching marker of the second metal layer as a reference. The marker as the reference of the first metal layer or the second metal layer is determined by selecting one of the contact holes 39a and 39b whose margin is smaller.

Figure 18J:
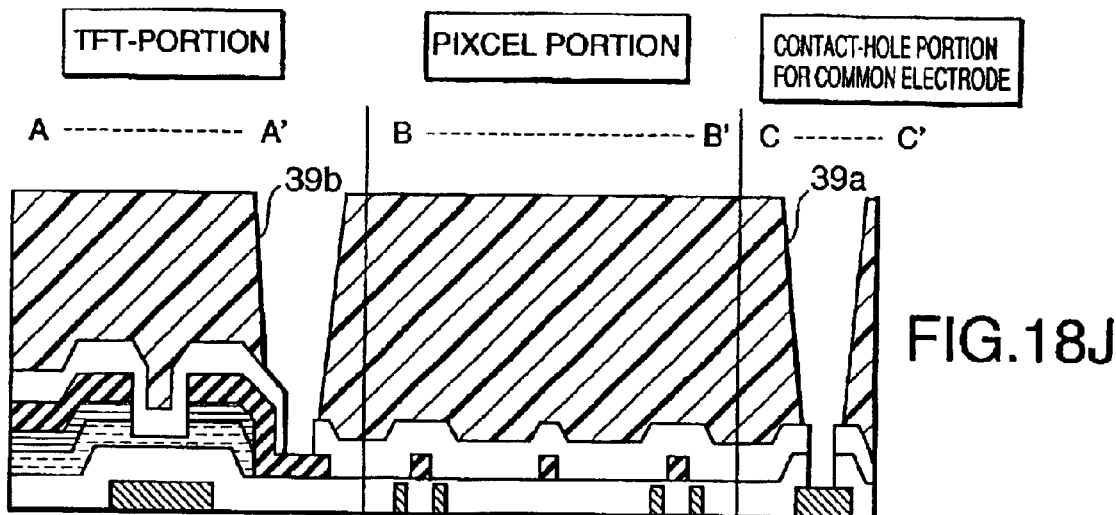

Thereafter, as shown in FIG. 18J, the exposed first nitride film as the first film 25a of the second interlayer insulating film 25 is etched away through the contact hole 39b for the pixel electrode and the contact hole 39a for the common electrode. Thus, the contact hole 39b reaches the pixel electrode. The etching through the contact hole 39a is further performed up to the common electrode wiring portion 26a or 26b by etching away the first interlayer insulating film 23 composed of the silicon dioxide ($SiO_2$) film and the silicon nitride (SiNx) film.

The exposure of the silicon nitride film as the first film 25a of the second interlayer insulating film 25 in the photolithographic processing is performed by using the matching marker of the first metal layer or the matching marker of the second metal layer as a reference. The marker as the reference of the first metal layer or the second metal layer is determined by selecting one of the contact holes 39a and 39b whose margin is smaller.

Figure 18K:
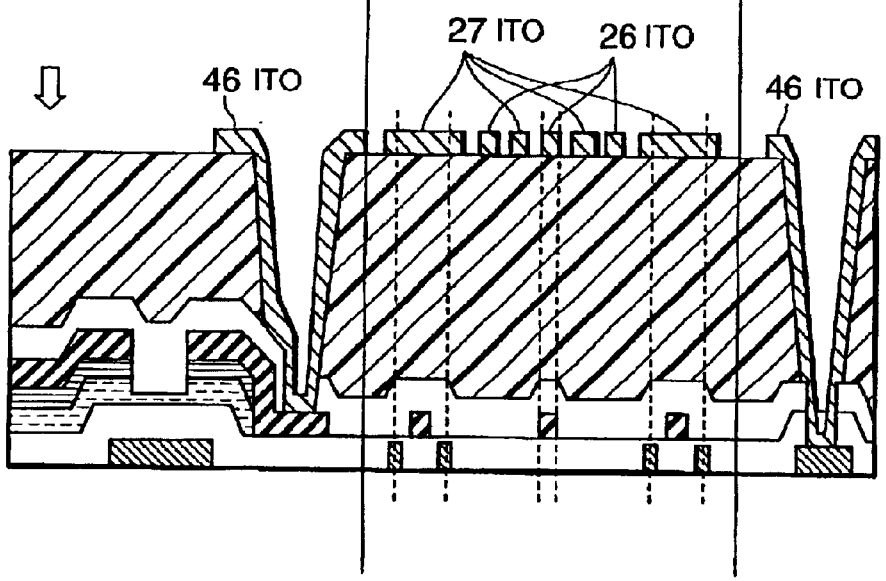

Thereafter, an ITO film 46 is deposited on the whole surface to cover inner walls of the contact holes 39a and 39b and, as shown in FIG. 18K, the common electrode 26 and the pixel electrode 27 are formed from the ITO film 46 in the unit element forming region by photolithography and etching.

The exposure to the ITO film 46 by photolithography is performed by using the matching marker of the second metal layer as a reference. This is because, when the common electrode 26, which is formed of ITO and covers the data line, is deviated with respect to the data line 24, the vertical cross-talk may occur.

Since the exposure error of the amorphous silicon layer and the second metal layer, which are formed after the formation of the protruded portions, can be corrected by the protruded portions, it is possible to manufacture the liquid crystal display device having improved aperture ratio and having no unevenness of display such as unevenness of division, without increase of the manufacturing cost.

SECOND EMBODIMENT

Figure 21A:
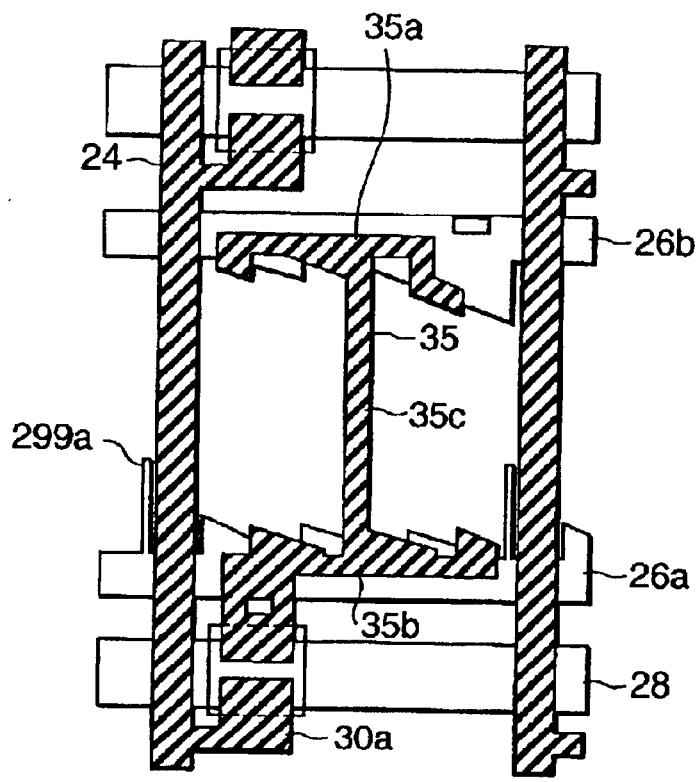
FIG. 21A is a plan view showing a region formed by a first metal layer and a second metal layer in a second embodiment of the present invention.
Figure 21B:
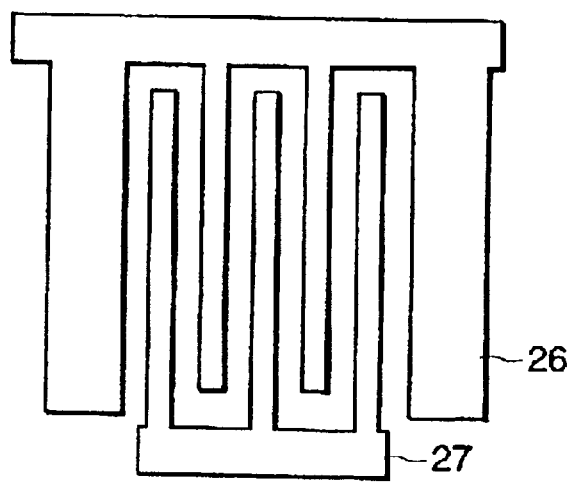
FIG. 21B is a plan view showing a region formed by a transparent electrode (ITO) to be overlapped on the region shown in FIG. 21A.

FIG. 21A and FIG. 21B shows the second embodiment, which are basically the same as FIG. 10A and FIG. 10B showing the first embodiment shown in FIG. 7, which show the region formed by the first and second metal layers shown in FIG. 7 and the region formed of ITO shown in FIG. 7, respectively. A manufacturing method of the liquid crystal display device according to the second embodiment is also the same as that of the first embodiment. The second embodiment differs from the first embodiment in the configuration of the protruded portions formed in the common electrode wiring portion 26a and extending in parallel to the longitudinal direction of the data line.

Although the protruded portions 299a and 299b of the common electrode wiring 26 are arranged on both sides of the data line 24 in a plane in the first embodiment, only one protruded portion (299a) having width larger than width of the protruded portion in the first embodiment is provided adjacent to the data line as shown in FIG. 21. The protruded portion 299a is 5 μm wide and 5 μm long. When the width of the protruded portion is sufficiently large, it is possible to correct the exposure error in exposing the amorphous silicon layer and the second metal layer, which are formed after the formation of the common electrode wiring, by measuring the width. Therefore, it is possible to manufacture the liquid crystal display device having improved aperture ratio and having no unevenness of display such as unevenness of division, without increase of the manufacturing cost.

THIRD EMBODIMENT

Figure 22A:
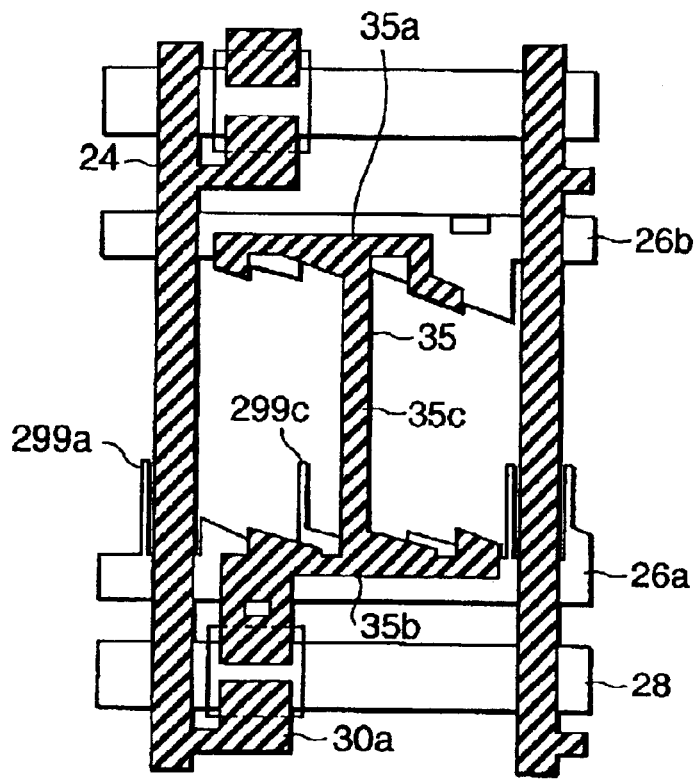
FIG. 22A is a plan view showing a region formed by a first metal layer and a second metal layer in a third embodiment of the present invention.
Figure 22B:
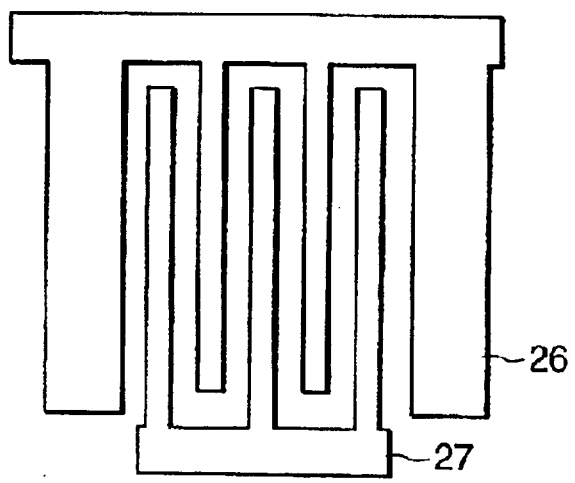
FIG. 22B is a plan view showing a region formed by a transparent electrode (ITO) to be overlapped on the region shown in FIG. 22A.

FIG. 22A and FIG. 22B shows the second embodiment, which are basically the same as FIG. 10A and FIG. 10B showing the first embodiment shown in FIG. 7, which show the region formed by the first and second metal layers shown in FIG. 7 and the region formed of ITO shown in FIG. 7, respectively. A manufacturing method of the liquid crystal display device according to the second embodiment is also the same as that of the first embodiment. The second embodiment differs from the first embodiment in the configuration of the protruded portions formed in the common electrode wiring portion 26a and extending in parallel to the longitudinal direction of the data line.

Although the protruded portions 299a and 299b of the common electrode wiring 26 are arranged adjacently on both sides of the data line 24 in a plane in the first embodiment, a protruded portion 299a is provided adjacently on one side of the data line 24 and another protruded portion 299c is provided slightly remote from the protruded portion 299a as shown in FIG. 22A.

Since it is possible to correct the exposure error in exposing the amorphous silicon layer and the second metal layer, which are formed after the formation of the common electrode wiring, in such arrangement of the protruded portions, it is possible to manufacture the liquid crystal display device having improved aperture ratio and having no unevenness of display such as unevenness of division, without increase of the manufacturing cost.

FOURTH EMBODIMENT

Figure 23A:
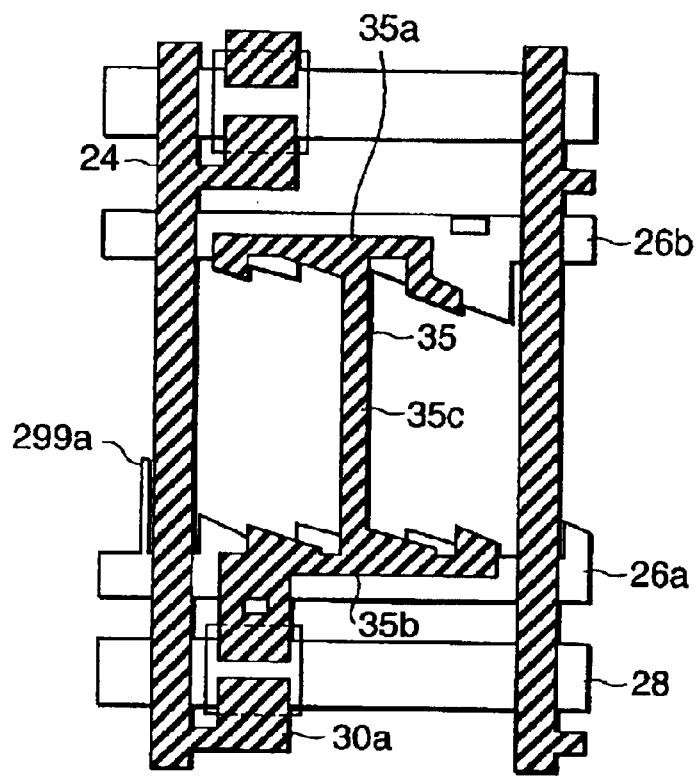
FIG. 23A is a plan view showing a region formed by a first metal layer and a second metal layer in a fourth embodiment of the present invention.
Figure 23B:
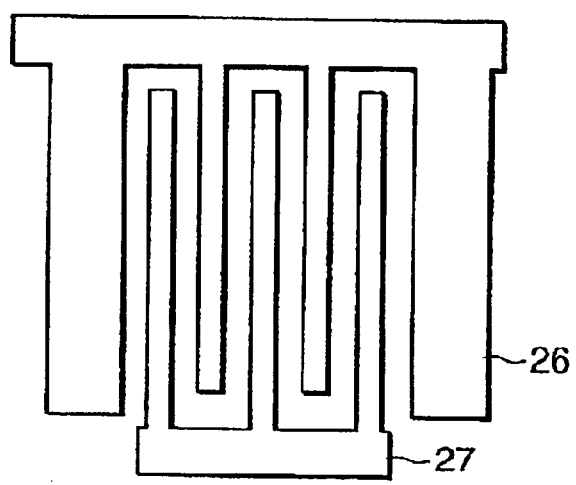
FIG. 23B is a plan view showing a region formed by a transparent electrode (ITO) to be overlapped on the region shown in FIG. 23A.

FIG. 23A and FIG. 23B shows the fourth embodiment, which are basically the same as FIG. 21A and FIG. 21B showing the second embodiment, which show the region formed by the first and second metal layers and the region formed of ITO, respectively. A manufacturing method of the liquid crystal display device according to the second embodiment is also the same as that of the first embodiment. The fourth embodiment differs from the second embodiment in the configuration of the protruded portions formed in the common electrode wiring portion 26a and extending in parallel to the longitudinal direction of the data line.

Although the protruded portion 299a of the common electrode wiring portion 26a is arranged in every pixel in the second embodiment, a protruded portion 299a is provided in only R pixel among the pixels of red (R), green (G) and blue (B) in the fourth embodiment as shown in FIG. 23A.

Since it is possible to correct the exposure error in exposing the amorphous silicon layer and the second metal layer, which are formed after the formation of the common electrode wiring, in even such arrangement of the protruded portions, it is possible to manufacture the liquid crystal display device having improved aperture ratio and having no unevenness of display such as unevenness of division, without increase of the manufacturing cost.

Alternatively, the protruded portion 299a may be provided in only pixel for color B or only pixel for color G. Alternatively, assuming the R, G and B pixels as a unit, one protruded portion 299a may be provided at intervals of two or more units.

Since it is possible to correct the exposure error in exposing the amorphous silicon layer and the second metal layer, which are formed after the formation of the common electrode wiring, in such arrangement of the protruded portions, it is possible to manufacture the liquid crystal display device having improved aperture ratio and having no unevenness of display such as unevenness of division, without increase of the manufacturing cost.

FIFTH EMBODIMENT

Figure 24A:
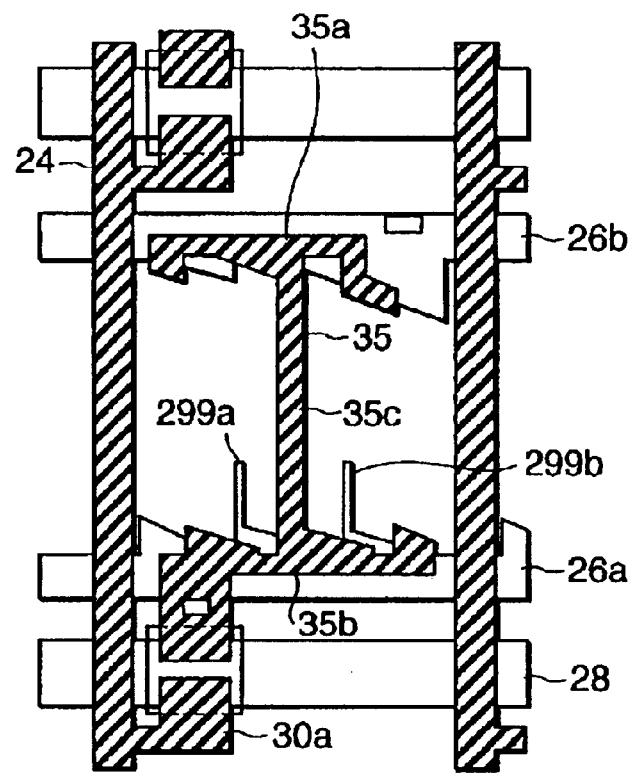
FIG. 24A is a plan view showing a region formed by a first metal layer and a second metal layer in a fifth embodiment of the present invention.
Figure 24B:
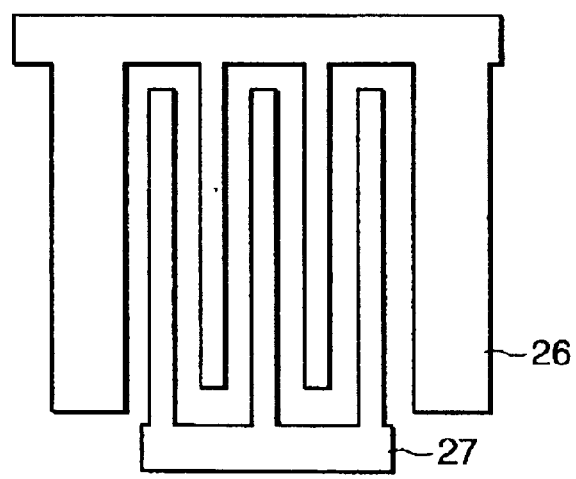
FIG. 24B is a plan view showing a region formed by a transparent electrode (ITO) to be overlapped on the region shown in FIG. 24A.

FIG. 24A and FIG. 24B shows the fifth embodiment, which are basically the same as FIG. 10A and FIG. 10B showing the first embodiment, which show the region formed by the first and second metal layers and the region formed of ITO, respectively. A manufacturing method of the liquid crystal display device according to the second embodiment is also the same as that of the first embodiment. The fifth embodiment differs from the first embodiment in the configuration of the protruded portions formed in the common electrode wiring portion 26a and extending in parallel to the longitudinal direction of the data line.

Although the protruded portions 299a and 299b of the common electrode wiring 26 are adjacently arranged on both sides of the data line 24 in the first embodiment, the protruded portions 299a and 299b are provided on both sides of the pixel auxiliary electrode 35 in the fifth embodiment as shown in FIG. 24A and FIG. 24B.

Since it is possible to correct the exposure error in exposing the amorphous silicon layer and the second metal layer, which are formed after the formation of the common electrode wiring, in even such arrangement of the protruded portions, it is possible to manufacture the liquid crystal display device having improved aperture ratio and having no unevenness of display such as unevenness of division, without increase of the manufacturing cost.

SIXTH EMBODIMENT

Figure 25A:
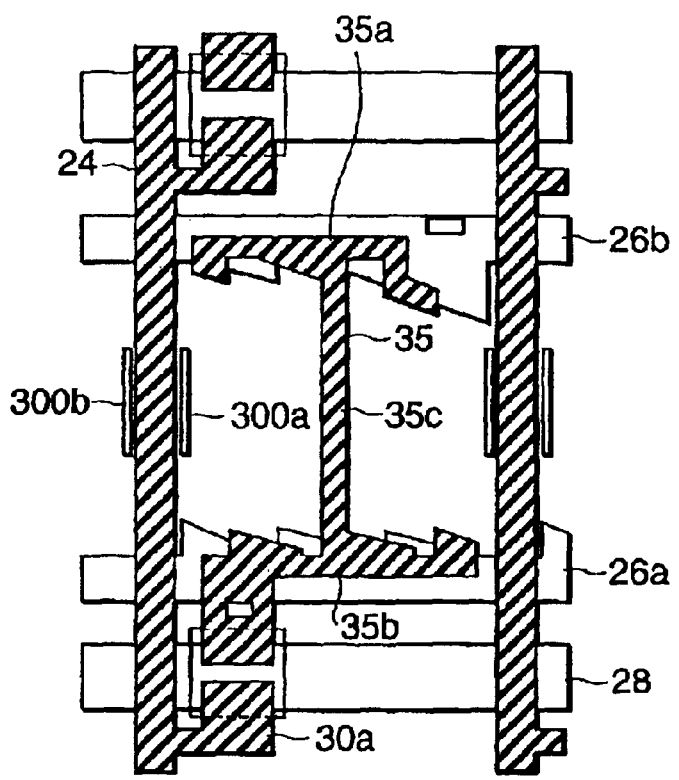
FIG. 25A is a plan view showing a region formed by a first metal layer and a second metal layer in a sixth embodiment of the present invention.
Figure 25B:
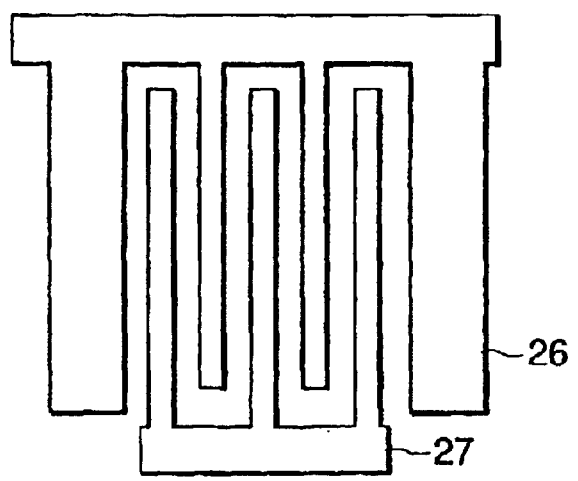
FIG. 25B is a plan view showing a region formed by a transparent electrode (ITO) to be overlapped on the region shown in FIG. 25A.

FIG. 25A and FIG. 25B shows the sixth embodiment, which are basically the same as FIG. 10A and FIG. 10B showing the first embodiment, which show the region formed by the first and second metal layers and the region formed of ITO, respectively. A manufacturing method of the liquid crystal display device according to the second embodiment is also the same as that of the first embodiment.

The sixth embodiment differs from the first embodiment in which the protruded portions extending in parallel to the longitudinal direction of the data line in that floating films 300a and 300b, which extend in parallel to the longitudinal direction of the data and are formed by the first metal layer, are arranged on both sides of the data line 24 in an electrically floating state with respect to any electrode.

Since it is possible to correct the exposure error in exposing the amorphous silicon layer and the second metal layer, which are formed after the formation of the common electrode wiring, in even such arrangement of the protruded portions, it is possible to manufacture the liquid crystal display device having improved aperture ratio and having no unevenness of display such as unevenness of division, without increase of the manufacturing cost.

SEVENTH EMBODIMENT

Figure 26A:
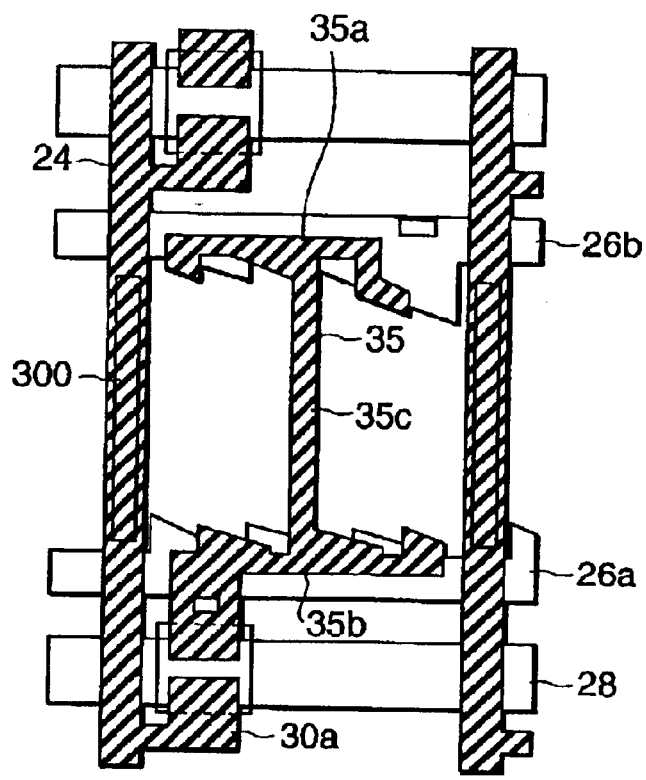
FIG. 26A is a plan view showing a region formed by a first metal layer and a second metal layer in a seventh embodiment of the present invention.
Figure 26B:
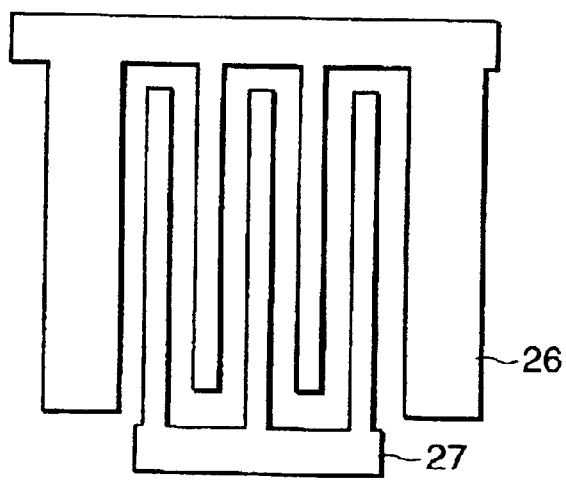
FIG. 26B is a plan view showing a region formed by a transparent electrode (ITO) to be overlapped on the region shown in FIG. 26A.

FIG. 26A and FIG. 26B shows the seventh embodiment, which are basically the same as FIG. 10A and FIG. 10B showing the first embodiment, which show the region formed by the first and second metal layers and the region formed of ITO, respectively. A manufacturing method of the liquid crystal display device according to the second embodiment is also the same as that of the first embodiment.

The seventh embodiment differs from the first embodiment in which the protruded portions extending in parallel to the longitudinal direction of the data line in that a floating film 300, which extends in parallel to the longitudinal direction of the data and is formed by the first metal layer, is arranged immediately below the data line 24 in an electrically floating state with respect to any electrode.

Figure 26C:
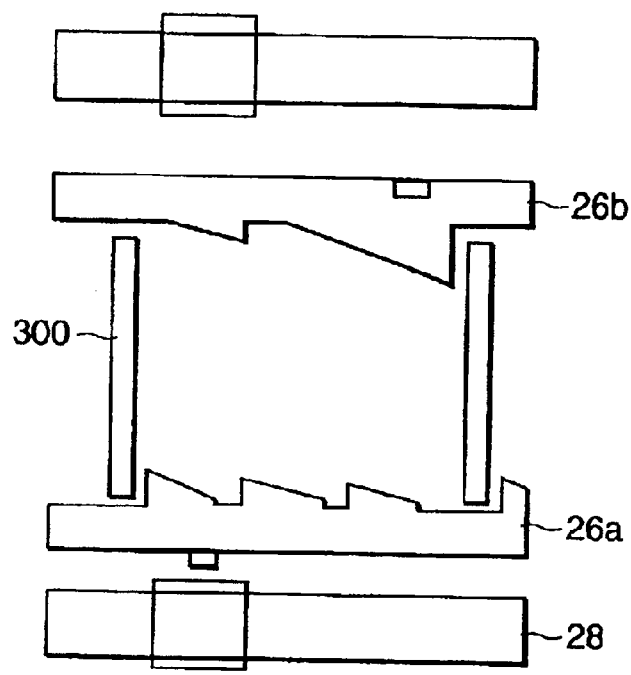
FIG. 26C is a plan view showing a region formed by a first metal layer and a second metal layer in the region shown in FIG. 26A.
Figure 26D:
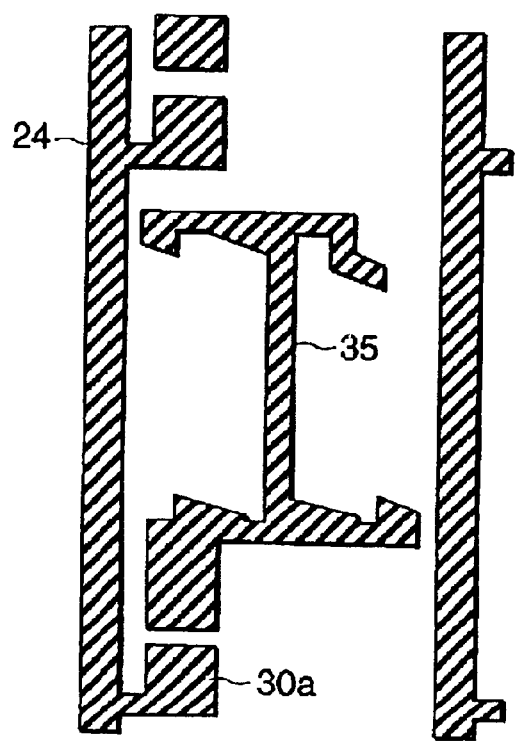
FIG. 26D is a plan view showing a region formed by the second metal layer in the region shown in FIG. 26A.

A region shown in FIG. 26A can be shown as a region formed by the first metal layer and the amorphous silicon layer (FIG. 26C) and a region formed by the second metal layer (FIG. 26D)

Since it is possible to correct the exposure error in exposing the amorphous silicon layer and the second metal layer, which are formed after the formation of the common electrode wiring, in even such arrangement of the protruded portions, it is possible to manufacture the liquid crystal display device having improved aperture ratio and having no unevenness of display such as unevenness of division, without increase of the manufacturing cost.

EIGHTH EMBODIMENT

Figure 27A:
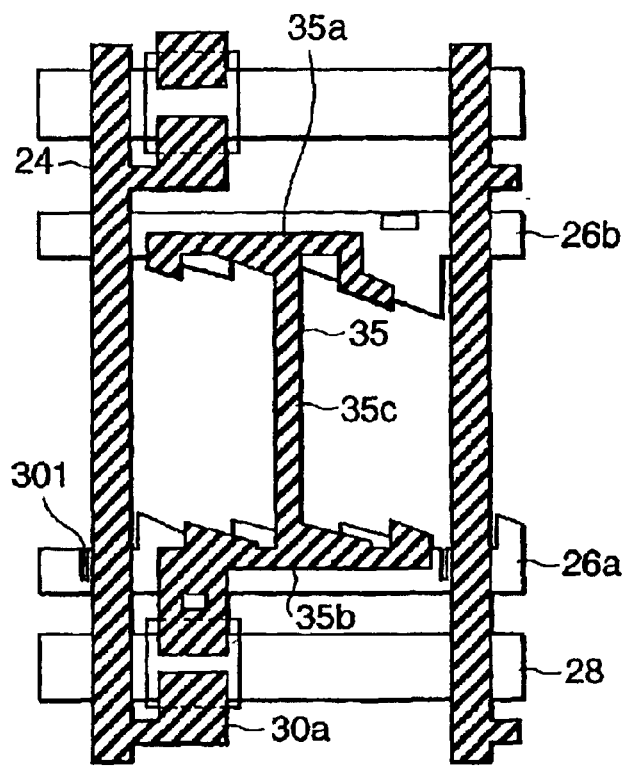
FIG. 27A is a plan view showing a region formed by a first metal layer and a second metal layer in an eighth embodiment of the present invention.
Figure 27B:
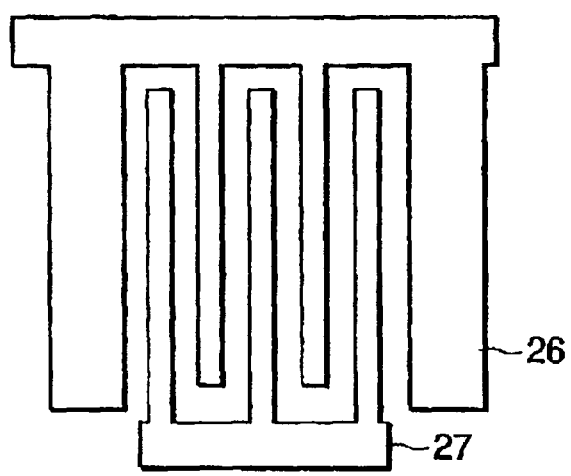
FIG. 27B is a plan view showing a region formed by a transparent electrode (ITO) to be overlapped on the region shown in FIG. 27A.

FIG. 27A and FIG. 27B shows the eighth embodiment, which are basically the same as FIG. 10A and FIG. 10B showing the first embodiment, which show the region formed by the first and second metal layers and the region formed of ITO, respectively. A manufacturing method of the liquid crystal display device according to the second embodiment is also the same as that of the first embodiment.

The eighth embodiment differs from the first embodiment in which the protruded portions 299a and 299b are arranged on the both sides of the data line 24 in that a recessed portion 301 is formed in the common electrode wiring portion 26a in a position adjacent to the data line 24 as shown in FIG. 27A. Width of the recessed portion 301 is made large similarly to the width of the protruded portion in the second embodiment. In the eighth embodiment, the recessed portion is 5 μm wide and 5 μm long.

Since it is possible to correct the exposure error in exposing the amorphous silicon layer and the second metal layer, which are formed after the formation of the common electrode wiring, in even such arrangement of the recessed portions if the width of the recessed portion is large enough, it is possible to manufacture the liquid crystal display device having improved aperture ratio and having no unevenness of display such as unevenness of division, without increase of the manufacturing cost.

NINTH EMBODIMENT

Figure 28A:
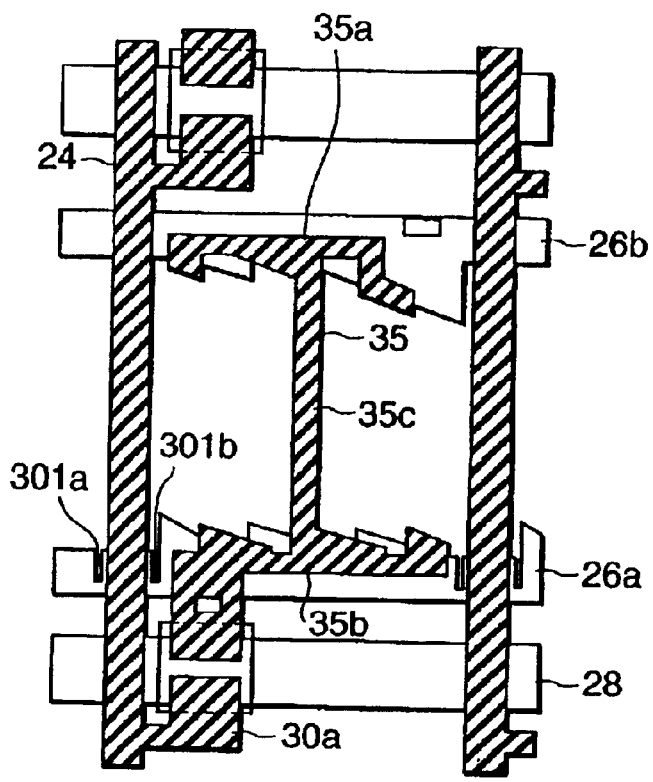
FIG. 28A is a plan view showing a region formed by a first metal layer and a second metal layer in a ninth embodiment of the present invention.
Figure 28B:
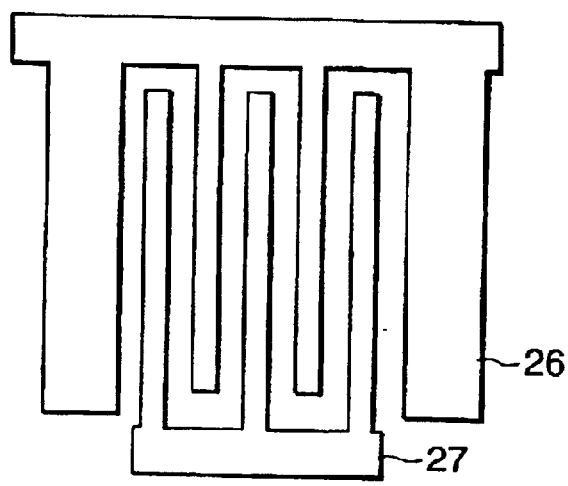
FIG. 28B is a plan view showing a region formed by a transparent electrode (ITO) to be overlapped on the region shown in FIG. 28A.

FIG. 28A and FIG. 28B shows the ninth embodiment, which are basically the same as FIG. 27A and FIG. 27B showing the first embodiment, which show the region formed by the first and second metal layers and the region formed of ITO, respectively. A manufacturing method of the liquid crystal display device according to the second embodiment is also the same as that of the first embodiment. The ninth embodiment differs from the eighth embodiment in that the configuration of a recessed portion formed in the common electrode wiring portion 26a and extending in parallel to the longitudinal direction of the data line is different from that in the eighth embodiment.

Although, in the eighth embodiment, the recessed portion 301 is formed in the common electrode wiring portion 26a adjacently to the data line 25, recessed portions 301a and 301b are formed on both sides of the data line 24 in the ninth embodiment as shown in FIG. 28A. Width of the recessed portion can be made smaller than that in the eighth embodiment and, in this embodiment, the recessed portion is 2 μm wide and 5 μm long.

Since it is possible to correct the exposure error in exposing the amorphous silicon layer and the second metal layer, which are formed after the formation of the common electrode wiring, in even such arrangement of the recessed portions, by measuring both edges of the two recessed portions even when the width of each recessed portion is small, it is possible to manufacture the liquid crystal display device having improved aperture ratio and having no unevenness of display such as unevenness of division, without increase of the manufacturing cost.

TENTH EMBODIMENT

Figure 29A:
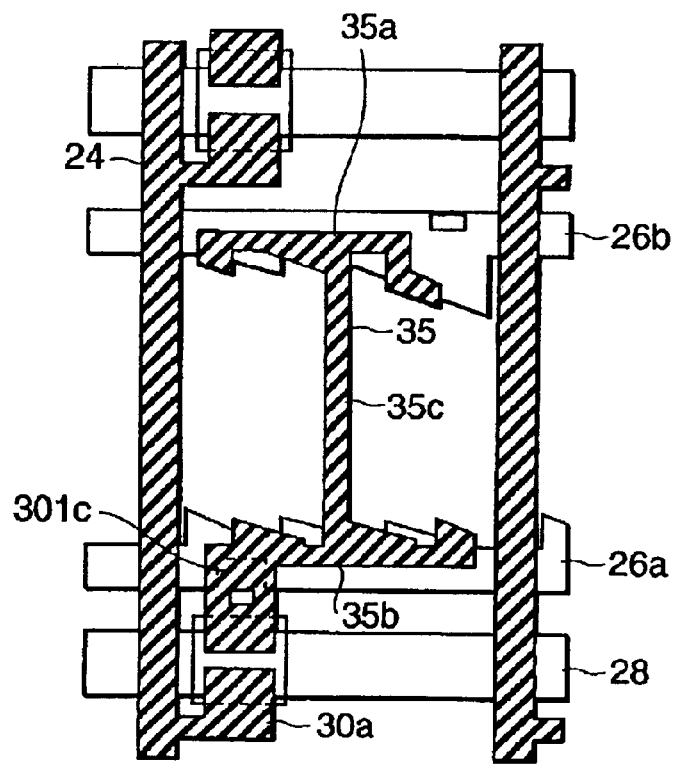
FIG. 29A is a plan view showing a region formed by a first metal layer and a second metal layer in a tenth embodiment of the present invention.
Figure 29B:
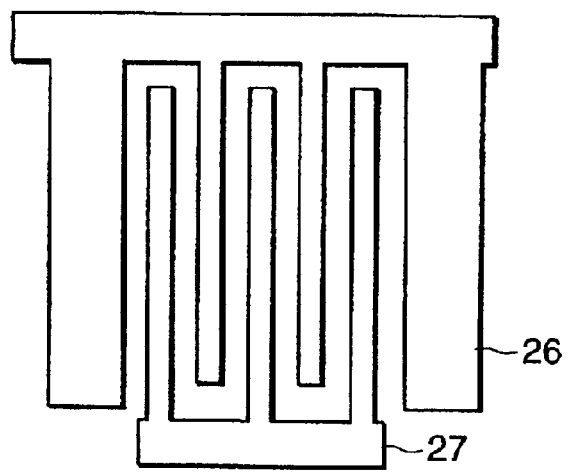
FIG. 29B is a plan view showing a region formed by a transparent electrode (ITO) to be overlapped on the region shown in FIG. 29A.

FIG. 29A and FIG. 29B shows the seventh embodiment, which are basically the same as FIG. 27A and FIG. 27B showing the first embodiment, which show the region formed by the first and second metal layers and the region formed of ITO, respectively. A manufacturing method of the liquid crystal display device according to the second embodiment is also the same as that of the first embodiment. However, the configuration of the recessed portion formed in the common electrode wiring portion 26a and extending in parallel to the longitudinal direction of the data line.

Figure 29C:
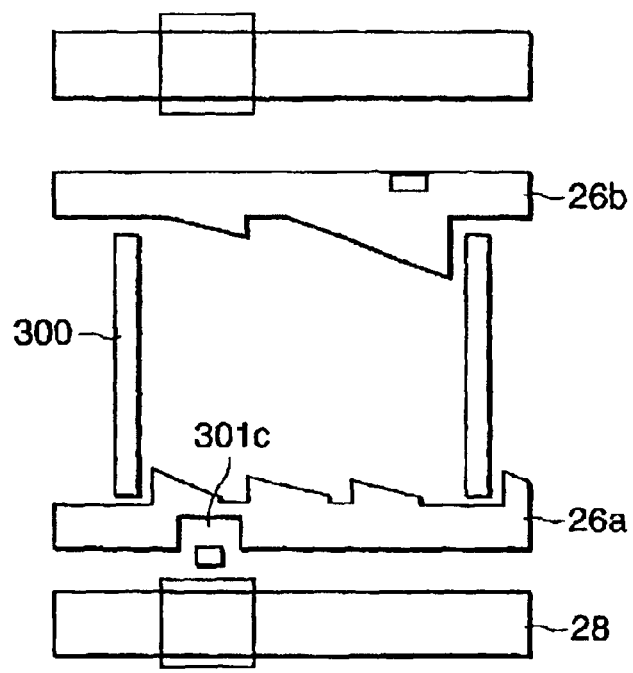
FIG. 29C is a plan view showing a region formed by the first metal layer and an amorphous silicon layer in the region shown in FIG. 29A.
Figure 29D:
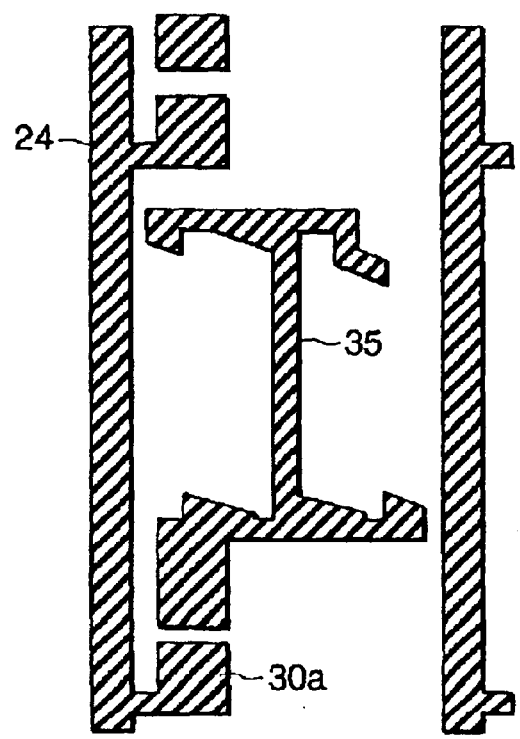
FIG. 29D is a plan view showing a region formed by the second metal layer and an amorphous silicon layer in the region shown in FIG. 29A.

The tenth embodiment differs from the eighth embodiment in which the recessed portion 301 is formed in the common electrode wiring portion 26a such that it is adjacent to the data line 24 in that a recessed portion 301c is formed in the common electrode wiring portion 26a in the vicinity of the contact hole 39b on both sides of the data line 24. A region shown in FIG. 29A can be shown as a region formed by the first metal layer and the amorphous silicon layer (FIG. 29C) and a region formed by the second metal layer (FIG. 29D), from which the configuration of the recessed portion 301c can be understood clearly. Width of the recessed portion 301c is larger than the width of the protruded portion in the eighth embodiment and, in this embodiment, the recessed portion 301c is 20 µm wide and 8 µm long.

Since it is possible to correct the exposure error in exposing the amorphous silicon layer and the second metal layer, which are formed after the formation of the common electrode wiring portions, in even such arrangement of the recessed portion, by measuring a distance between the edges of the recessed portion 301c, it is possible to manufacture the liquid crystal display device having improved aperture ratio and having no unevenness of display such as unevenness of division, without increase of the manufacturing cost.

ELEVENTH EMBODIMENT

Figure 30A:
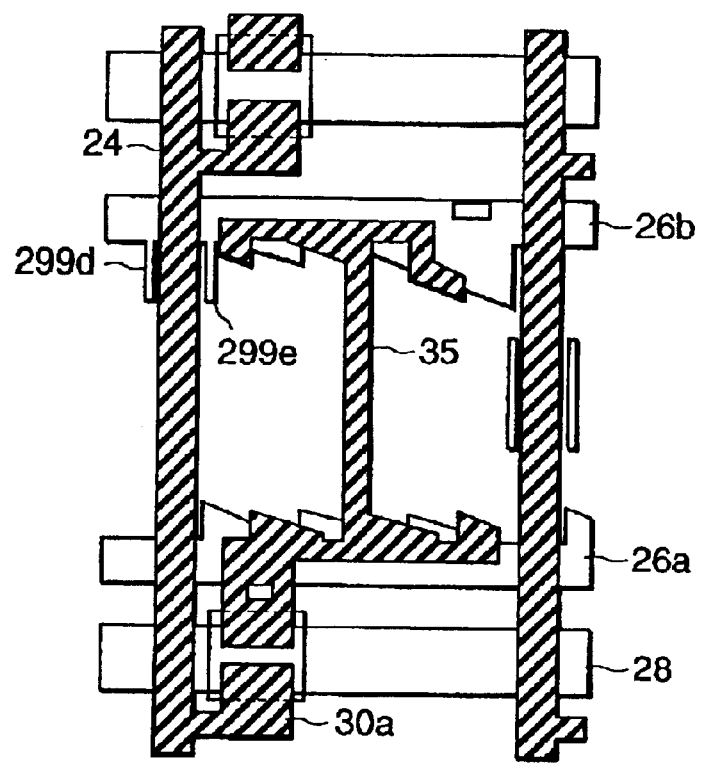
FIG. 30A is a plan view showing a region formed by a first metal layer and a second metal layer in an eleventh embodiment of the present invention.
Figure 30B:
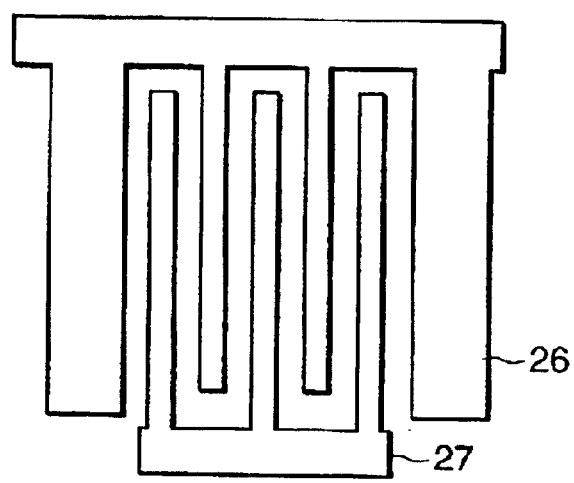
FIG. 30B is a plan view showing a region formed by a transparent electrode (ITO) to be overlapped on the region shown in FIG. 30A.

FIG. 30A and FIG. 30B shows the eleventh embodiment, which are basically the same as FIG. 10A and FIG. 10B showing the first embodiment shown in FIG. 7, which show the region formed by the first and second metal layers shown in FIG. 7 and the region formed of ITO shown in FIG. 7, respectively. A manufacturing method of the liquid crystal display device according to the second embodiment is also the same as that of the first embodiment. The eleventh embodiment differs from the first embodiment in the common electrode wiring in which the protruded portions formed in the common electrode wiring portion 26a and extending in parallel to the longitudinal direction of the data line.

Although the protruded portions 299a and 299b are formed in the common electrode wiring portion 26a in the first embodiment, protruded portions are formed in the common electrode wiring portion 26b in the eleventh embodiment as shown in FIG. 30a. Each of the protruded portions 299d and 299e is 2 µm wide and 20 µm long. Since it is possible to correct the exposure error in exposing the amorphous silicon layer and the second metal layer, which are formed after the formation of the common electrode wiring portion, by measuring a distance between opposite edges of the protruded portion even if the width thereof is small, it is possible to manufacture the liquid crystal display device having improved aperture ratio and having no unevenness of display such as unevenness of division, without increase of the manufacturing cost.

TWELFTH EMBODIMENT

Figure 31A:
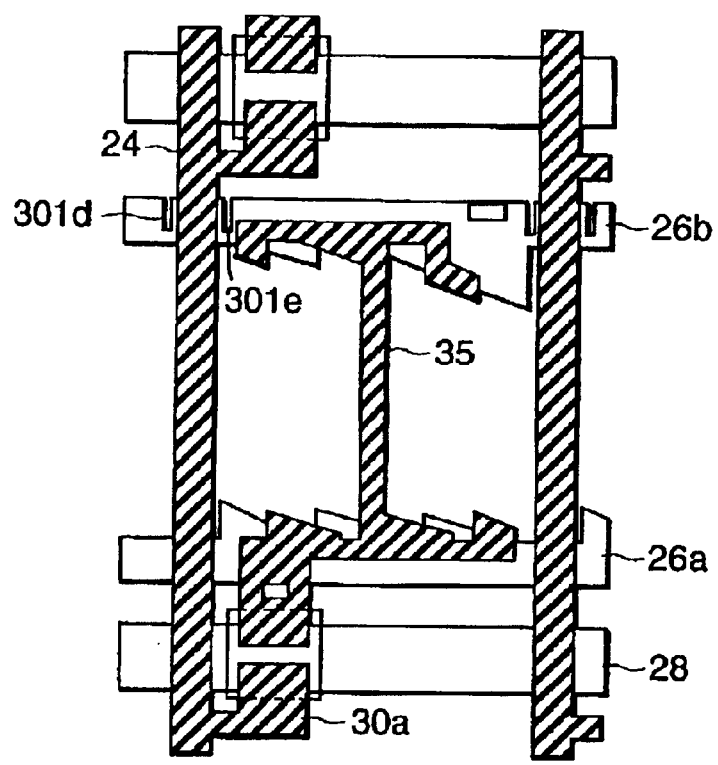
FIG. 31A is a plan view showing a region formed by a first metal layer and a second metal layer in a twelfth embodiment of the present invention.
Figure 31B:
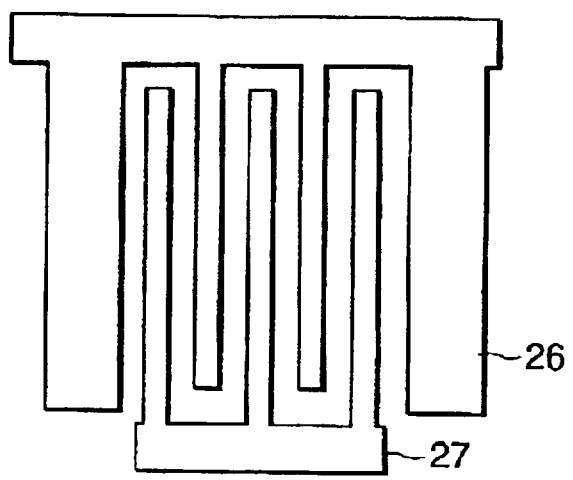
FIG. 31B is a plan view showing a region formed by a transparent electrode (ITO) to be overlapped on the region shown in FIG. 31A.

FIG. 31A and FIG. 31B shows the twelfth embodiment, which are basically the same as FIG. 28A and FIG. 28B showing the ninth embodiment, which show the region formed by the first and second metal layers and the region formed of ITO, respectively. A manufacturing method of the liquid crystal display device according to the twelfth embodiment is also the same as that of the ninth embodiment. The twelfth embodiment differs from the ninth embodiment in that the common electrode wiring in which recessed portions are formed and which extend in parallel to the longitudinal direction of the data line and the number of the protruded portions are different from those in the ninth embodiment.

Although, in the eighth embodiment, the recessed portion 301 is formed in the common electrode wiring portion 26a adjacently to the data line 25, recessed portions 301d and 301e are formed in the common electrode wiring portion 26b on both sides of the data line 24 in the twelfth embodiment as shown in FIG. 31A. Each of the recessed portions is 2 µm wide and 5 µm long.

Since it is possible to correct the exposure error in exposing the amorphous silicon layer and the second metal layer, which are formed after the formation of the common electrode wiring, in even such arrangement of the recessed portions, by measuring both edges of the two recessed portions even when the width of each recessed portion is small, it is possible to manufacture the liquid crystal display device having improved aperture ratio and having no unevenness of display such as unevenness of division, without increase of the manufacturing cost.

THIRTEENTH EMBODIMENT

Figure 32A:
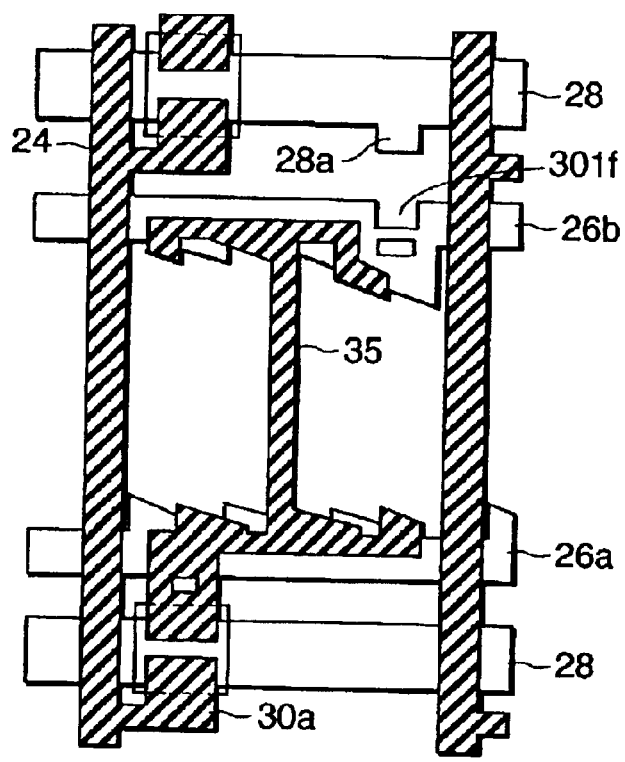
FIG. 32A is a plan view showing a region formed by a first metal layer and a second metal layer in a thirteenth embodiment of the present invention.
Figure 32B:
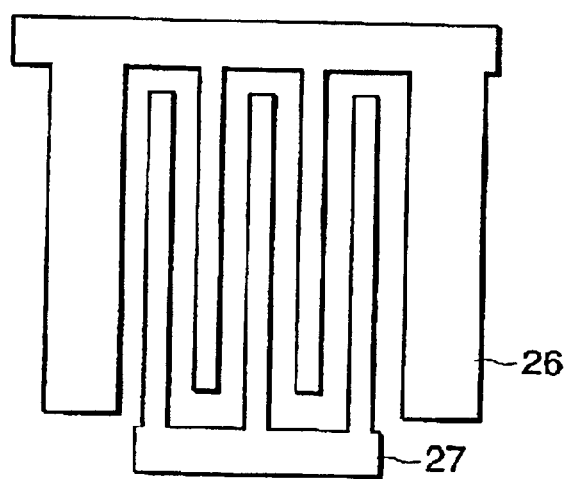
FIG. 32B is a plan view showing a region formed by a transparent electrode (ITO) to be overlapped on the region shown in FIG. 32A.

FIG. 32A and FIG. 32B shows the thirteenth embodiment, which are basically the same as FIG. 10A and FIG. 10B showing the first embodiment shown in FIG. 7, which show the region formed by the first and second metal layers shown in FIG. 7 and the region formed of ITO shown in FIG. 7, respectively. A manufacturing method of the liquid crystal display device according to the second embodiment is also the same as that of the first embodiment. A difference of the thirteenth embodiment from the first embodiment is that it has a protruded portion and a recessed portion.

Although the two protruded portions are formed in the common electrode wiring portion 26a on both sides of the data line 24 in the first embodiment, a protruded portion 28a is formed in a portion of the scanning line 28 and a recessed portion 301f is formed in the common electrode wiring portion 26b in the thirteenth embodiment as shown in FIG. 32A.

The protruded portion 28a is 5 µm wide and 5 µm long and the recessed portion 301f is 5 µm wide and 5 µm deep. Since, in this embodiment, the scanning line 28 and the common electrode wiring portions 26a and 26b are formed of the same material in the same step, the protruded portion 28a and the recessed portion 301f are formed such that a short-circuit between them is prevented.

Since, it is possible to correct the exposure error in exposing the amorphous silicon layer and the second metal layer, which are formed after the formation of the common electrode wiring, by measuring a distance between both edges of the protruded portion 28a or the recessed portion 301f, it is possible to manufacture the liquid crystal display device having improved aperture ratio and having no unevenness of display such as unevenness of division, without increase of the manufacturing cost.

FOURTEENTH EMBODIMENT

Figure 33A:
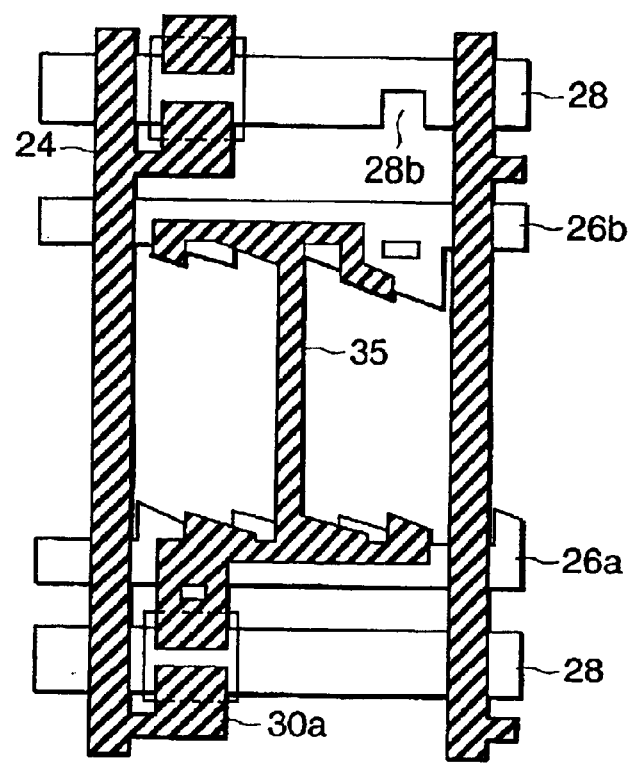
FIG. 33A is a plan view showing a region formed by a first metal layer and a second metal layer in a fourteenth embodiment of the present invention.
Figure 33B:
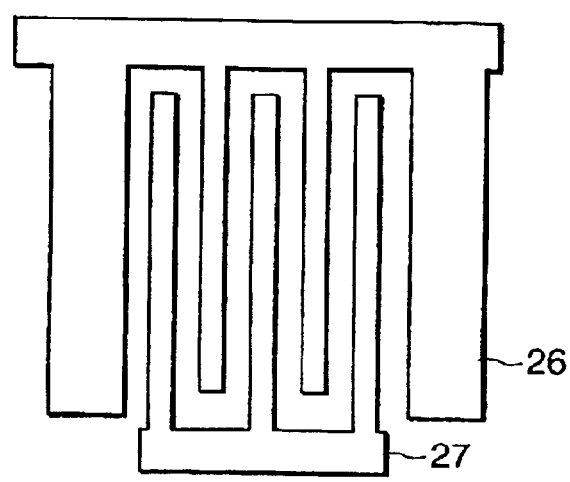
FIG. 33B is a plan view showing a region formed by a transparent electrode (ITO) to be overlapped on the region shown in FIG. 33A.

FIG. 33A and FIG. 33B shows the thirteenth embodiment, which are basically the same as FIG. 32A and FIG. 32B showing the thirteenth embodiment, which show the region formed by the first and second metal layers and the region formed of ITO, respectively. A manufacturing method of the liquid crystal display device according to the second embodiment is also the same as that of the first embodiment. A difference of the fourteenth embodiment from the thirteenth embodiment is that it has a protruded portion and a recessed portion, which extend in parallel to the longitudinal direction of the data line.

Although the protruded portion 28a is formed in the scanning line 28 and the recessed portion 301f is formed in the common electrode wiring 26b in the thirteenth embodiment, a recessed portion 28b is formed in a portion of the scanning line 28. The recessed portion 28b is 5 μm wide and 5 μm deep.

Since, it is possible to correct the exposure error in exposing the amorphous silicon layer and the second metal layer, which are formed after the formation of the common electrode wiring, by measuring a distance between both edges of the recessed portion 28a, it is possible to manufacture the liquid crystal display device having improved aperture ratio and having no unevenness of display such as unevenness of division, without increase of the manufacturing cost.

The structure of the unit element of the liquid crystal display device having the common electrode and the pixel electrode, which are liquid crystal driving electrodes of straight line type has been described in detail. However, in view of the provision of the liquid crystal display device, which can prevent unevenness of display without increasing the manufacturing cost, it is possible to provide the protruded portion or portions in the common electrode wiring portions of a unit element of a liquid crystal display device, which has bent liquid crystal electrodes, that is, the so-called multi domain unit element structure, with effects to those obtained by the described embodiments can be obtained.

Further, although the common electrode and the pixel electrodes have been described as being formed in the same layer, the common electrode and the pixel electrodes may be arranged on both sides of a third interlayer insulating film in view of the provision of the liquid crystal display device, which can prevent unevenness of display without increasing the manufacturing cost.

In each of the described embodiments, the protruded portion or the recessed portion, which can be used as a reference in a fine distance measurement during the alignment exposure may be arranged in not all of the pixels but pixels for only R.

Alternatively, the reference may be provided in pixels for only G or B.

Alternatively, assuming the R, G and B pixels as a unit, one protruded portion may be provided at intervals of two or more units.

In the latter case, the fine distance measurement in the lateral direction is also possible and it is possible to perform a correct alignment. Therefore, it is possible to manufacture a liquid crystal display device having no unevenness of display such as unevenness of division.

Although, in the described embodiments, only the featured portions of the present invention have been described in detail and portions thereof, which are well known by those skilled in the art, have been not described in detail. However, the well-known portions should be considered as matters, which can be easily estimated by those skilled in the art.

As described hereinbefore, according to the present invention, it is possible to provide an IPS mode active matrix type liquid crystal display device, which has an improved aperture ratio and has no unevenness of display such as unevenness of division, without increasing the manufacturing cost.

According to experiments conducted by the present inventors, it has been confirmed that an IPS mode active matrix type liquid crystal display device, which has an aperture ratio improved compared with the conventional liquid crystal display device and no unevenness of display, is obtained without increase of the manufacturing cost.

What is claimed is:

1. An in-plane switching mode active matrix type liquid crystal display device comprising:

a first electrically conductive layer formed on a first substrate for constituting scanning lines and common electrode wiring portions extending over a plurality of pixel regions, said first electrically conductive layer having a positioning reference pattern region extending in a direction orthogonal to extending directions of said scanning lines and said common electrode wiring portions;

a first insulating layer formed on said first substrate to cover said first electrically conductive layer;

a plurality of switching elements formed on said first insulating layer substrate so as to be associated with said scanning lines and being correspond to said plurality of pixel regions, respectively;

a second electrically conductive layer formed on said first insulating layer for constituting data lines and electrodes for switching elements formed for every said pixel regions in combination with said scanning lines, said data lines being extending over said pixel regions in such manner that a direction of said data lines is coincident with the extending direction of said positioning reference pattern region;

a second insulating layer formed on said second electrically conductive layer;

a third electrically conductive layer formed on said second insulating layer for constituting pixel electrode and common electrode for each of said pixel regions, said pixel electrode being electrically connected to one of said electrodes for said switching elements through first contact-holes formed in said second insulating layer, said common electrode being electrically connected to said common electrode wiring portions through second contact-holes formed in said first insulating layer and said second insulating layer;

a second substrate arranged in an opposing relation to said first substrate; and a liquid crystal layer sandwiched between said first substrate and said second substrate.

2. An in-plane switching mode active matrix type liquid crystal display device as claimed in claim 1, wherein said common electrode is made of a transparent electrode material; each of said data lines is located under said common electrode so as to be covered with said common electrode except a portion adjacent to said scanning lines by widening overlapping portions of said common electrode above said data lines; and said positioning reference pattern region comprises at least one of a protruded portion and a recessed portion formed in at least one of a portion of said common electrode wiring and a portion of said scanning line.

3. An in-plane switching mode active matrix type liquid crystal display device as claimed in claim 1, wherein said pixel electrodes and said common electrode are made of the same material.

4. An in-plane switching mode active matrix type liquid crystal display device as claimed in claim 1, further comprising a black matrix layer formed on said opposing substrate so as to be overlapped with said data lines, said black matrix layer has a width smaller than a width of said common electrode formed to cover said data lines such that there is no light shielding film between said common electrode covering said data line and said pixel electrodes adjacent thereto in a plan view.

5. An in-plane switching mode active matrix type liquid crystal display device as claimed in claim 2, wherein said positioning reference pattern region is arranged in such a positional relation that each of said data lines is located between said positioning reference pattern regions.

6. An in-plane switching mode active matrix type liquid crystal display device as claimed in claim 2, wherein width of said positioning reference pattern region is within a range of 2 μm to 10 μm.

7. An in-plane switching mode active matrix type liquid crystal display device as claimed in claim 2, wherein length of said protruded portion is not width of said positioning reference pattern region is within a range of between 5 μm and a dimension of an aperture of each of said pixel regions.

8. An in-plane switching mode active matrix type liquid crystal display device as claimed in claim 1, wherein each of said switching elements is a thin film transistor having a semiconductor layer region formed on said first insulating layer above said scanning lines as a gate electrodes of said thin film transistor, a source electrode and a drain electrode on said semiconductor layer are formed by said second electrically conductive layer and said data lines and said pixel electrodes are electrically connected to one of said source electrode and said drain electrode and to the other, respectively.

9. An in-plane switching mode active matrix type liquid crystal display device as claimed in claim 8, wherein a color layer and a black matrix layer are formed on said second substrate, said common electrode is supplied with a reference potential, said common electrode wiring portions and said scanning lines are formed of the same material in the same step, said gate electrode, said drain electrode, said source electrode and said common electrode are electrically connected to said scanning lines, said data lines, said pixel electrodes and said common electrode, respectively, a display is performed by rotating molecular axis of said liquid crystal layer by electric field substantially in parallel to a principal surface of said first substrate and between said pixel electrodes and said common electrode, each of said data lines except a portion thereof in the vicinity of said scanning lines is completely overlapped and covered by said common electrode, at least one of a protruded portion and a recessed portion, which extend in an extending direction of said data lines, is provided by at least one of a portion of said common electrode wiring portions and a portion of said scanning lines in every pixel region, width of said black matrix layer arranged in a position opposing to each of said data lines in the region in which each of said data lines is completely covered by said common electrode is small than width of said common electrode covering said data line and there is no light shielding film between said common electrode covering said data line and said pixel electrode adjacent thereto.

10. An in-plane switching mode active matrix type liquid crystal display device as claimed in claim 1, wherein said positioning reference pattern regions are arranged in regions in the vicinity of said data lines as floating regions electrically separated from said scanning lines and said common electrode wiring portions.

11. An in-plane switching mode active matrix type liquid crystal display device as claimed in claim 10, wherein at least one of said floating regions is formed in only one of a red pixel region, a green pixel region and a blue pixel region.

12. An in-plane switching mode active matrix type liquid crystal display device as claimed in claim 10, wherein at least one of said floating regions is formed at intervals of several pixel regions.

13. An in-plane switching mode active matrix type liquid crystal display device as claimed in claim 10, wherein at least one of said floating regions is formed immediately below said data lines by interposing said first insulating layer therebetween.

14. A manufacturing method for manufacturing an in-plane switching mode active matrix type liquid crystal display device as claimed in claim 1, comprising the step of exposing at least a display region thereof by using a photo mask having divided patterns of the display region, wherein, in patterning a new layer of a lamination of layers by photolithography, an exposure correction between divided exposures is performed by finely measuring a relative position of said common electrode wiring layer on the basis of said positioning reference pattern region.

* * * * *